(12) United States Patent
Won et al.

(10) Patent No.: US 8,441,514 B2
(45) Date of Patent: May 14, 2013

(54) METHOD AND APPARATUS FOR TRANSMITTING AND RECEIVING DATA USING MOBILE TERMINAL

(75) Inventors: Jong Pil Won, Seoul (KR); Jung Su Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 834 days.

(21) Appl. No.: 12/606,725

(22) Filed: Oct. 27, 2009

(65) Prior Publication Data

US 2010/0103243 A1  Apr. 29, 2010

(30) Foreign Application Priority Data

Oct. 27, 2008  (KR) .................. 10-2008-0105360

(51) Int. Cl.
*H04N 7/14* (2006.01)

(52) U.S. Cl.
USPC .................................... 348/14.02; 348/14.03

(58) Field of Classification Search ............... 348/14.02, 348/14.03, 14.01; 455/466
See application file for complete search history.

(56) References Cited

U.S. PATENT DOCUMENTS

| | | |
|---|---|---|
| 5,239,373 A | 8/1993 | Tang et al. |
| 5,689,300 A | 11/1997 | Shibata et al. |
| 2001/0049289 A1 * | 12/2001 | Kim ............................ 455/466 |
| 2002/0078088 A1 | 6/2002 | Kuruoglu et al. |
| 2003/0189636 A1 * | 10/2003 | Ejima et al. ............... 348/14.02 |
| 2007/0078930 A1 | 4/2007 | Ludwig et al. |
| 2011/0081926 A1 * | 4/2011 | Monteiro et al. ............ 455/466 |
| 2011/0319105 A1 * | 12/2011 | Weiner ........................ 455/466 |

FOREIGN PATENT DOCUMENTS

EP  0 379 354 A2  7/1990

OTHER PUBLICATIONS

Tang et al., "VideoDraw: A Video Interface for Collaborative Drawing", ACM Transactions on Information Systems, vol. 9, No. 2, Apr. 1, 1991, pp. 170-184, XP000604184.

\* cited by examiner

*Primary Examiner* — Stella Woo

(74) *Attorney, Agent, or Firm* — Birch, Stewart, Kolasch & Birch, LLP

(57) ABSTRACT

A method and apparatus for efficiently transmitting and receiving image data of a drawn sketch using a mobile terminal is disclosed. The method for transmitting data in the mobile terminal includes enabling a data transmission input mode to be selected, and compressing image data up to an allowable text transmission size and transmitting the compressed image data if the data transmission input mode is an image mode. The data may further include time information, and the time information provides a relative time when images are generated. The data may further include an identifier for identifying various transmission modes or reception modes, and malfunction of the system can be prevented by the identifier.

13 Claims, 23 Drawing Sheets

FIG. 5A

| | | |
|---|---|---|
| | CMD_CODE | Command Code |
| | SUB_CMD_CODE | Subcommand Code |
| | PRIORITY | Priority Representation |
| | TID | Tele Service ID |
| 200 | LANGUAGE | 0 In Case Of Korean |
| | TYPE | Normal(0), voice sms(1), DMS(2) — 201 |
| | PHONE NUMBER | Receiver Phone Number |
| | MY NUMBER | Transmitter Phone Number |
| | LENGTH | Total Length Of DATA |
| | DATA | If Type = '0' or '1', SMS data<br>If Type = '2', DMS data is compressed and changed to be suitable for maximum length received in data — 202 |

FIG. 5B

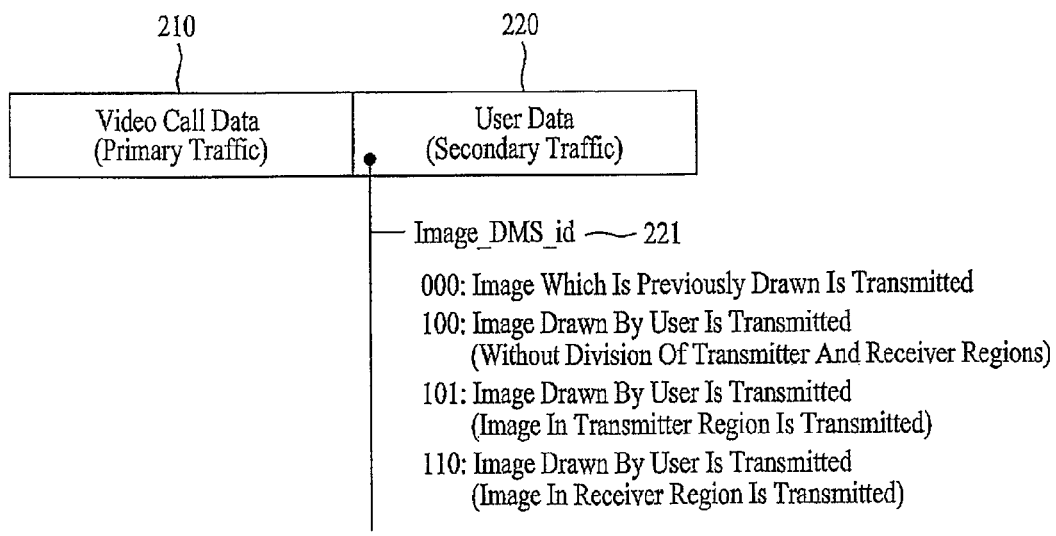

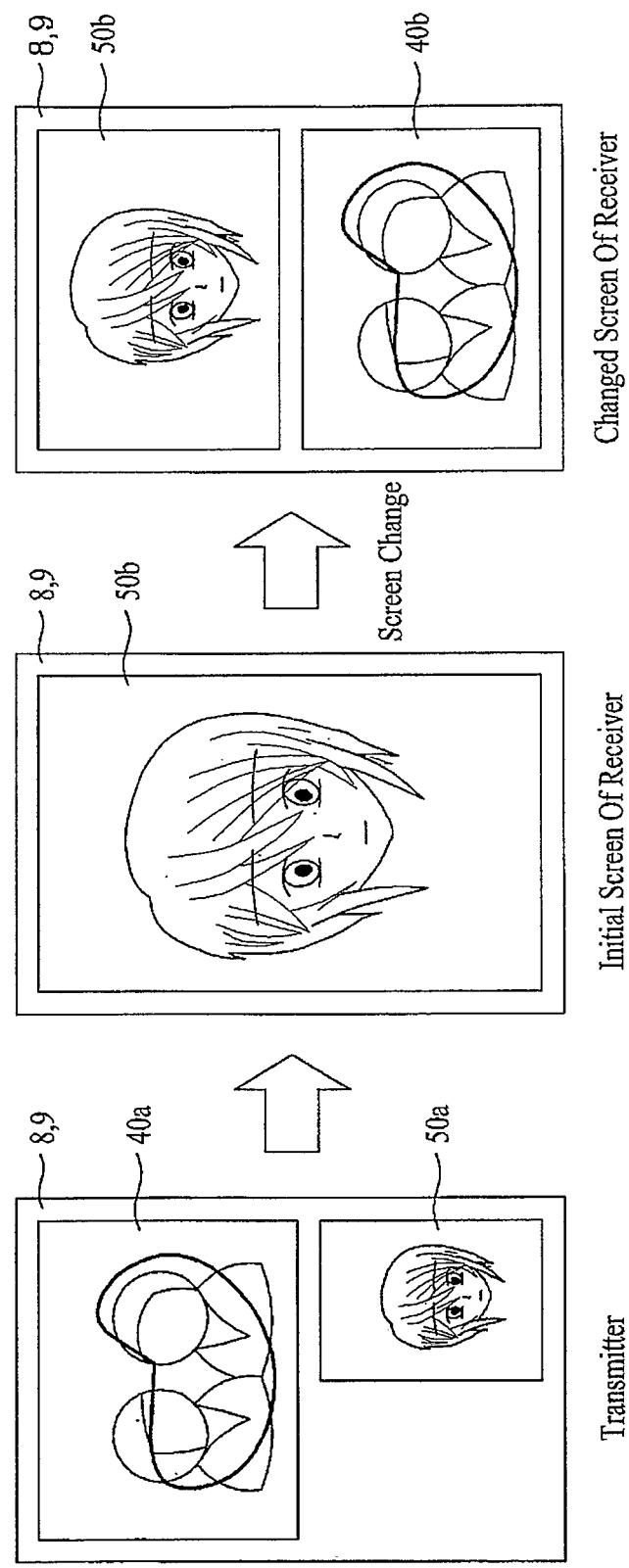

FIG. 9A

| CMD_CODE | Command Code |
|---|---|
| ⋮ | ⋮ |
| TYPE | Normal(0), voice sms(1), DMS(2) | — 301
| Time_Info_id | None(0), YES(1) | — 302
| ⋮ | ⋮ |
| DATA | If Type = '0' or '1', SMS data<br>If Type = '2', DMS data is compressed and changed to be suitable for maximum length received in data<br>If Time_Info_id = 1, Time Information Is Included. | — 303

| Video Call Data (Primary Traffic) 310 | User Data (Secondary Traffic) 320 |
|---|---|

- Image_DMS_id — 321

000: Image Which Is Previously Drawn Is Transmitted
  100: Image Drawn By User Is Transmitted
  (Without Division Of Transmitter And Receiver Regions)
  101: Image Drawn By User Is Transmitted
  (Image In Transmitter Region Is Transmitted)
  110: Image Drawn By User Is Transmitted
  (Image In Receiver Region Is Transmitted)

- Time_Info_id — 322

0: Time Information Is Not Included
  1: Time Information Is Included

METHOD AND APPARATUS FOR TRANSMITTING AND RECEIVING DATA USING MOBILE TERMINAL

This application claims the benefit of Korean Patent Application No. 10-2008-0105360, filed on Oct. 27, 2008, which is hereby incorporated by reference as if fully set forth herein.

BACKGROUND OF THE INVENTION

1. Field of the Invention

The present invention relates to a method and apparatus for transmitting and receiving data using a mobile terminal.

2. Discussion of the Related Art

Recently, interpersonal communication using a mobile terminal has come into wide use. The mobile terminal refers to various devices such as a mobile phone, a Personal Digital Assistant (PDA), and a smart phone. In the present invention, the mobile terminal refers to a product which is applicable to all apparatuses utilized in interpersonal communication regardless of the device.

In interpersonal communication using the mobile terminal, voice call, video call or text transmission is widely used. Recently, various research into a method for transmitting an image drawn by a caller using a mobile terminal have been conducted.

However, research into the method for transmitting image data using the mobile terminal in consideration of technical restrictions or compatibility with the existing system are necessary, but a detailed method thereof was not suggested. This leads to great confusion in transmission of image data using the mobile terminal.

SUMMARY OF THE INVENTION

Accordingly, the present invention is directed to a method and apparatus for transmitting and receiving data using a mobile terminal that substantially obviates one or more problems due to limitations and disadvantages of the related art.

An object of the present invention is to provide a method and apparatus for efficiently transmitting and receiving image data using a mobile terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting data in a mobile terminal includes generating image data from a sketch being drawn on a screen of the mobile terminal; and compressing the image data of the sketch to at most an allowable text transmission size and transmitting the compressed image data when a data transmission input mode of the mobile terminal is an image mode.

To achieve these objects and other advantages and in accordance with the purpose of the invention, as embodied and broadly described herein, an apparatus for transmitting data in a mobile terminal includes a communication unit which performs communication with an external device; a user input unit which allows data and/or an image in a form of a sketch being drawn to be input; and a controller which generates image data from the sketch being drawn from the user input unit, controls the image data of the sketch to be compressed to at most an allowable text transmission size, and controls the compressed image data to be transmitted when a data transmission input mode of the mobile terminal is an image mode.

To achieve these objects and other advantages and in accordance with the purpose of the invention, as embodied and broadly described herein, a method for receiving data in a mobile terminal includes determining whether data received in a transmission format is text or an image; and decompressing the received image data when the received data is an image, and displaying the decompressed image data in an image display mode of the mobile terminal, wherein the decompressed image data is a sketch drawn on a screen of another mobile terminal.

To achieve these objects and other advantages and in accordance with the purpose of the invention, as embodied and broadly described herein, an apparatus for receiving data in a mobile terminal includes a communication unit which performs communication with an external device; a display unit which displays received data; and a controller which determines whether data received in a transmission format is text or an image, controls the received image data to be decompressed when the received data is an image, and controls the decompressed image data to be displayed in an image display mode of the mobile terminal, wherein the decompressed image data is a sketch drawn on a screen of another mobile terminal.

According to the embodiments of the present invention, it is possible to efficiently transmit image data using a mobile terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 5A and 5B are views showing data formats according to an embodiment of the present invention;

FIG. 6 is a view showing an example of a method for receiving image data according to an embodiment of the present invention;

FIGS. 9A and 9B are views showing data formats according to another embodiment of the present invention;

DETAILED DESCRIPTION OF THE INVENTION

Hereinafter, various embodiments of the present invention will be described with reference to the accompanying drawings. It will be apparent that the embodiments of the present invention are intended to describe the technical spirit of the embodiments of the present invention and the technical range of the present invention is not limited to the embodiments.

Figure 1:
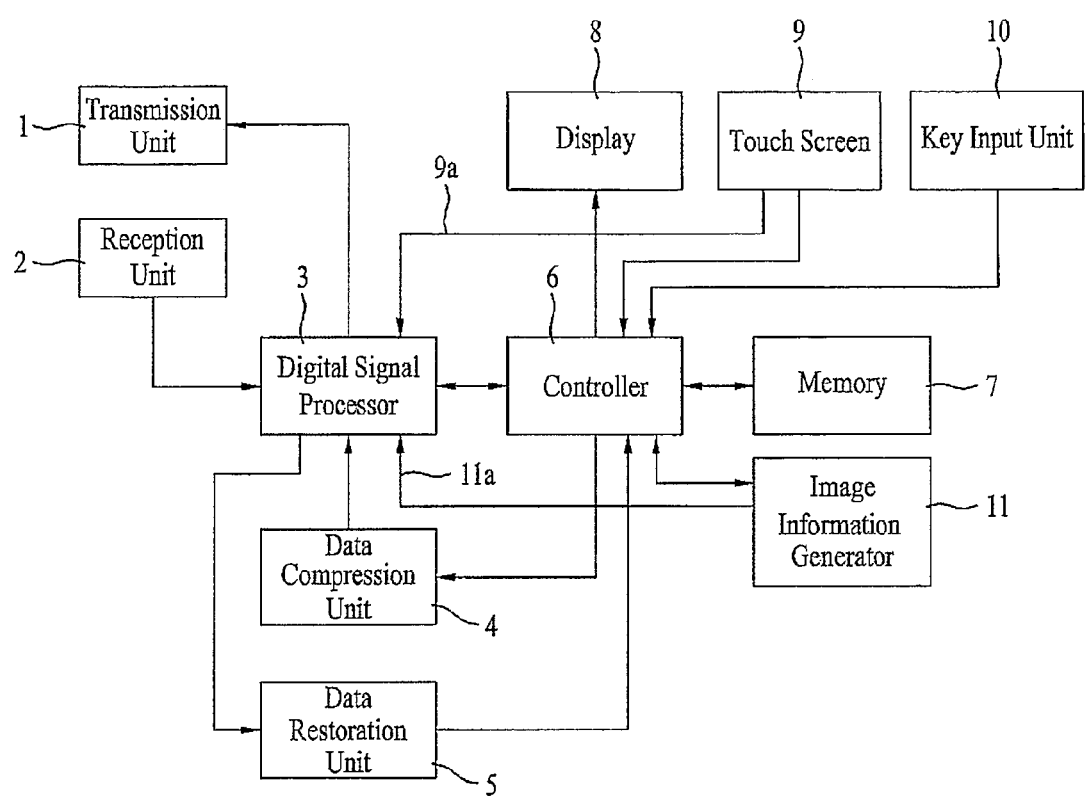
FIG. 1 is a block diagram showing a transmitting/receiving apparatus in a mobile terminal according to the present invention.

FIG. 1 is a block diagram showing an example of a transmitting/receiving apparatus in a mobile terminal according to the present invention.

According to the embodiment of the present invention, the mobile terminal includes a transmission unit 1 for transmitting data to an external device and a reception unit 2 for receiving data from the external device. The transmission unit 1 and the reception unit 2 may be collectively referred to as a "communication unit" for performing communication.

In addition, the mobile terminal includes a digital signal processor 3 for signal-processing the data to be transmitted by the transmission unit 1 in a transmission data format and signal-processing the data received by the reception unit 2 based on a data format.

The mobile terminal further includes a data compression unit 4 for compressing data to be transmitted, if necessary, and a data restoration unit 5 for decompressing the received data. The example of data compression and restoration will be described in detail in the below-described embodiments.

In addition, the mobile terminal includes a key input unit 10 and/or a touch screen 9, as a user input unit. The key input unit 10 may be used when text is input and the touch screen 9 may be used when a user directly draws an image and transmits the image. The touch screen 9 is also referred to as a touch pad.

The mobile terminal includes a display 8 (or a display unit) to provide an image to be transmitted and a received image to the user. The display unit 8 includes a device or a software program for dividing and displaying a text display mode and an image display mode.

The mobile terminal includes a memory 7 (or memory unit) to temporarily store transmitted or received data and store a specific program used in transmission and reception of a variety of data.

In addition, the mobile terminal includes an image information generator 11 to generate image information during a video call. For example, a camera module in the mobile terminal is used as the image information generator.

Data 11*a* generated by the image information generator 11 and data 9*a* generated by the touch screen 9 may be input to the digital signal processor 3. In this case, the digital signal processor 3 may separate and process the input data 11*a* and 9*a* or mix and process the input data 11*a* and 9*a*. That is, for example, the data 9*a* generated by the touch screen 9 during the video call and the image data 11*a* generated by the image information generator 11 during the video call is combined into one image, the combined image is signal-processed, and the signal-processed image is transmitted using the transmission unit 1.

The mobile terminal includes a controller 6 (or a control unit) to control the operations of the components configuring the mobile terminal. The operations and functions of the components in the mobile terminal will be described in detail in the below-described embodiments.

FIGS. 2A to 2D are views showing methods for transmitting a variety of data using a mobile terminal according to the present invention.

Figure 2A:
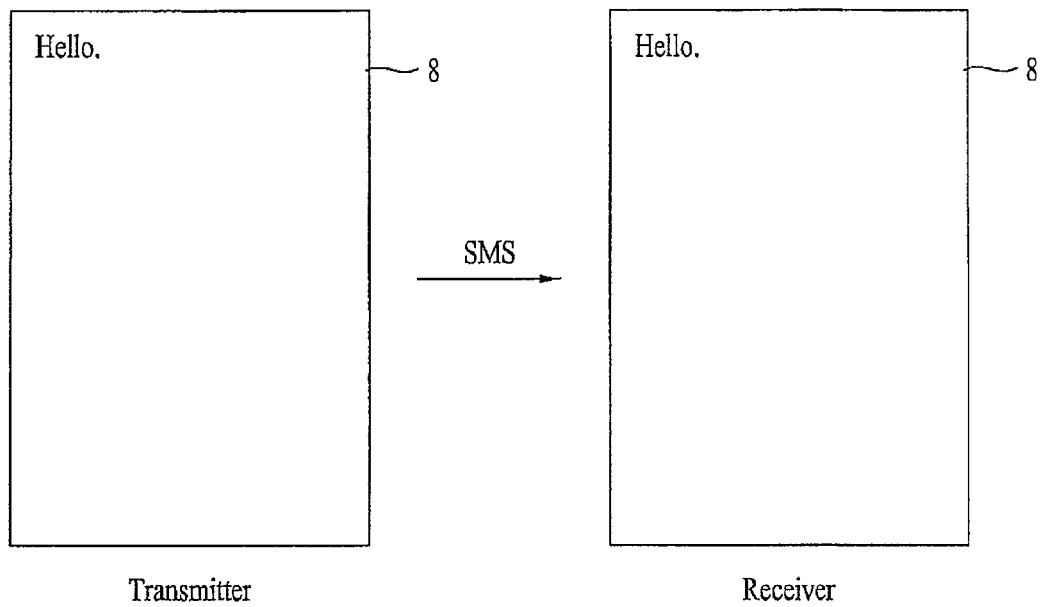
FIGS. 2A to 2D are views showing methods for transmitting a variety of data using a mobile terminal according to the present invention.

FIG. 2A shows a method for transmitting data in a Short Messaging Service (SMS) mode. The SMS mode which is more commonly known as a text message refers to a mode for inputting text by a transmitter (a transmitter side user) on the screen of the display 8 and transmitting the text to a receiver. A general SMS transmission mode is designed such that only text having a predetermined size (e.g., about 80 bytes) or less is capable of being transmitted. FIG. 2A shows an example in which a transmitter inputs text "Hello" on the screen of the display 8 and then transmits the text to a receiver such that the transmitted text "Hello" is displayed on the screen of the display 8 of the receiver.

Figure 2B:
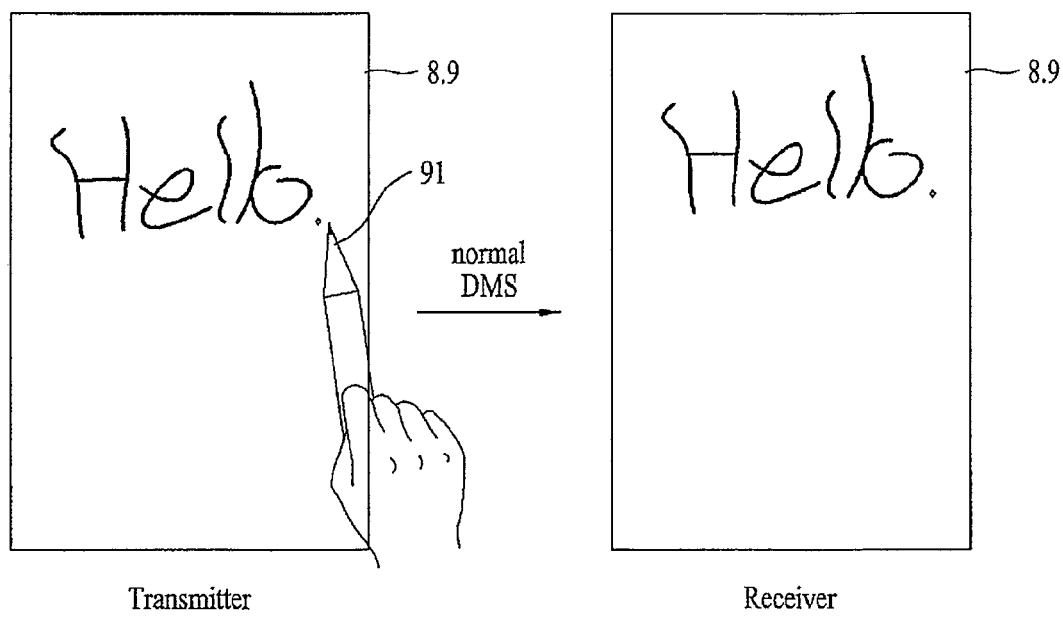

FIG. 2B shows a method for transmitting image data (in the present invention, referred to as a Drawing Messaging Service (DMS) mode), as a method for transmitting data. Hereinafter, a DMS transmission method of FIG. 2B is called a normal DMS, compared with DMS transmission methods during a video call of FIGS. 2C and 2D. The mobile terminal of the transmitter includes the touch screen 9 so as to establish an environment in which the transmitter can directly draw an image on the touch screen 9. FIG. 2B shows, for example, a case where the transmitter directly draws a specific image on the touch screen 9 using a touch pen (or a stylus) 91 (for example, a case where the transmitter handwrites the text "Hello"). The tool for drawing the image on the touch screen 9 is not limited to the touch pen 91, and the transmitter's (or the user's) finger or other writing instruments may be used. The image drawn by the transmitter is displayed on the screen of the display 8 in a normal DMS transmission mode. If the touch screen 9 is included in the mobile terminal of the receiver (a receiver side user), a response message may be transmitted in the normal DMS transmission mode by the same method. The detailed method for transmitting and receiving data in the normal DMS transmission mode will be described later.

Figure 2C:
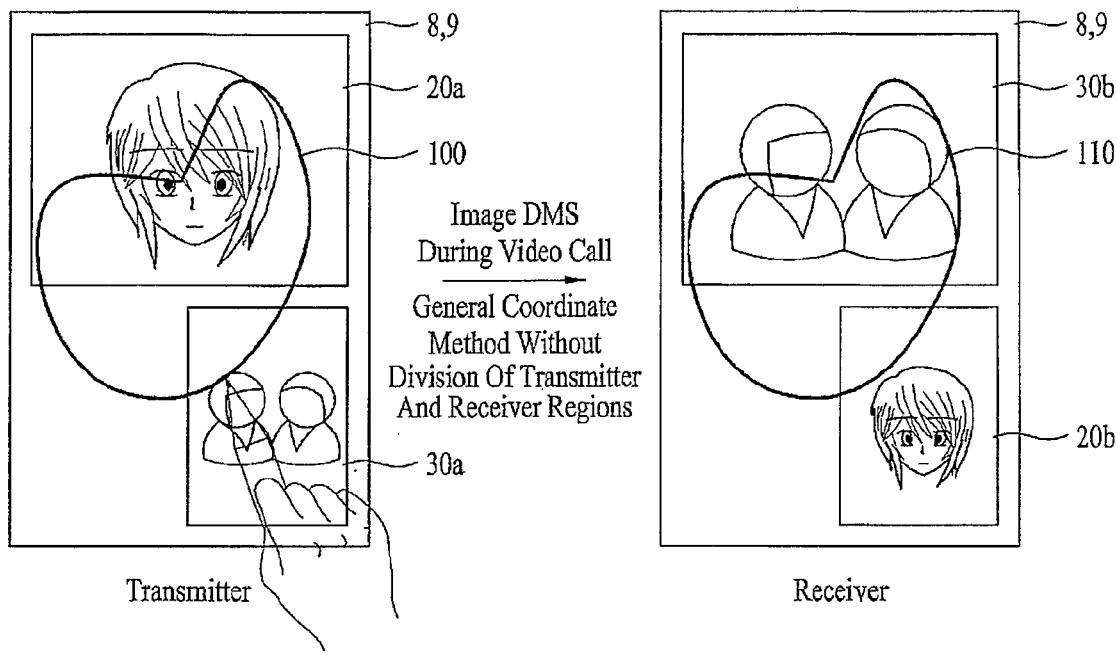
Figure 2D:
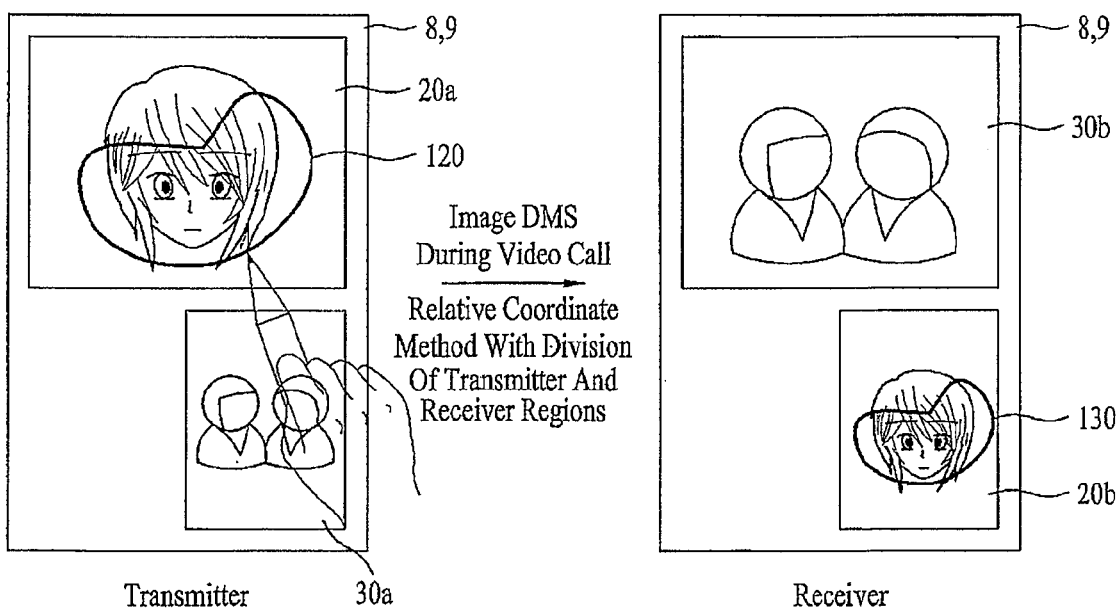

FIGS. 2C and 2D show, for example, methods for transmitting image data in a DMS mode during a video call, as a method for transmitting data. For convenience of description, these methods may be called a "voice call image DMS" (briefly, referred to as an "image DMS") mode, compared with the normal DMS mode of FIG. 2B. In particular, the image DMS mode is divided into a mode without division of transmitter and receiver regions (FIG. 2C) and a mode with division of transmitter and receiver regions (FIG. 2D).

That is, as shown in FIG. 2C, when the transmitter directly draws a specific image (e.g., a heart-shaped image 100) on the touch screen 9 during the voice call, the image is equally displayed on the screen of the display 8 of the receiver (110). At this time, the image 20*a* of the receiver and the image 30*a* of the transmitter are displayed on the screen of the display 8 of the transmitter, and the image 20*b* of the receiver and the image 30*b* of the transmitter are displayed on the screen of the display 8 of the receiver. In FIG. 2C, the sizes of the images of the transmitter and the receiver in the screen of the display are arbitrarily set, and it will be apparent that the sizes of the respective images may be changed and displayed.

In FIG. 2D, when the transmitter directly draws a specific image (e.g., a heart-shaped image 120) on the touch screen 9 in a receiver image region 20a during the voice call, the image is correspondingly displayed on the screen of the display 8 of the receiver in the receiver image region 20b (130). That is, when the transmitter draws the image at a desired location or in a desired region and transmits the image together with a coordinate thereof, the display of the receiver displays the image in the desired region or at the desired location that corresponds to those of the transmitter. The method for transmitting the data shown in FIGS. 2C and 2D will be described in detail in the below-described embodiments.

Figure 3A:
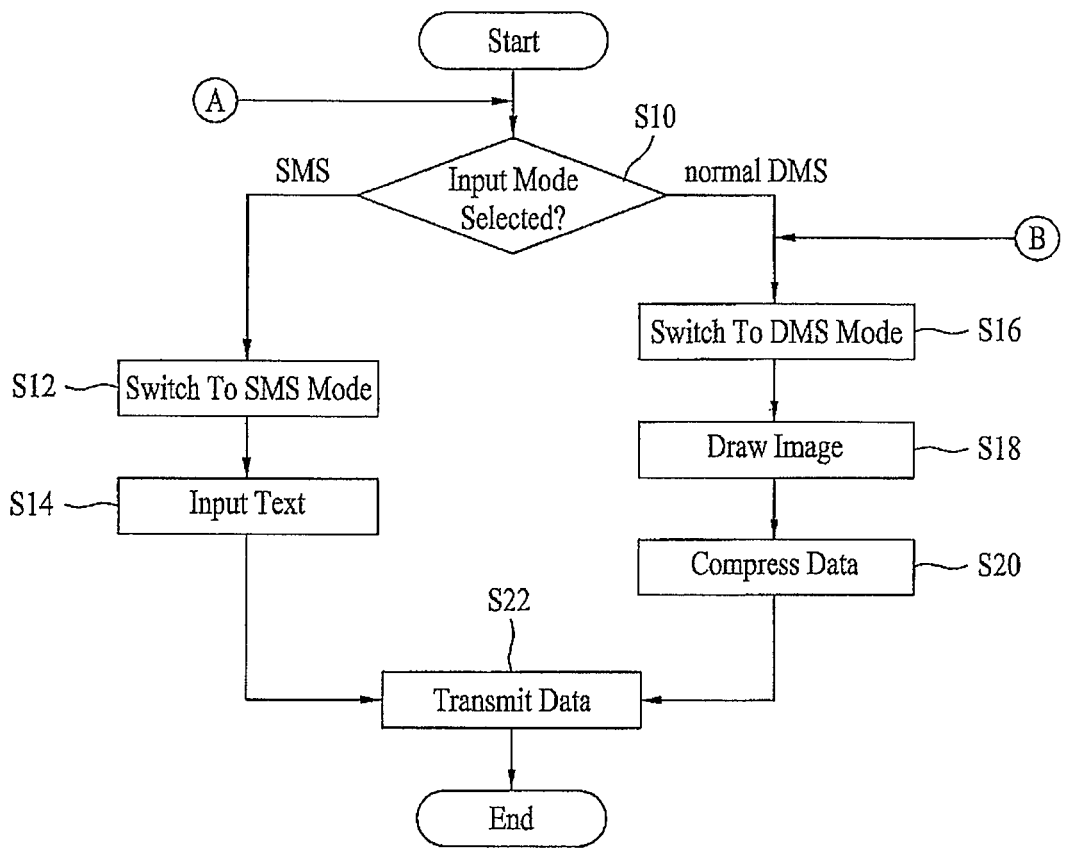
FIGS. 3A and 3B are flowcharts illustrating methods for transmitting image data according to embodiments of the present invention.
Figure 3B:
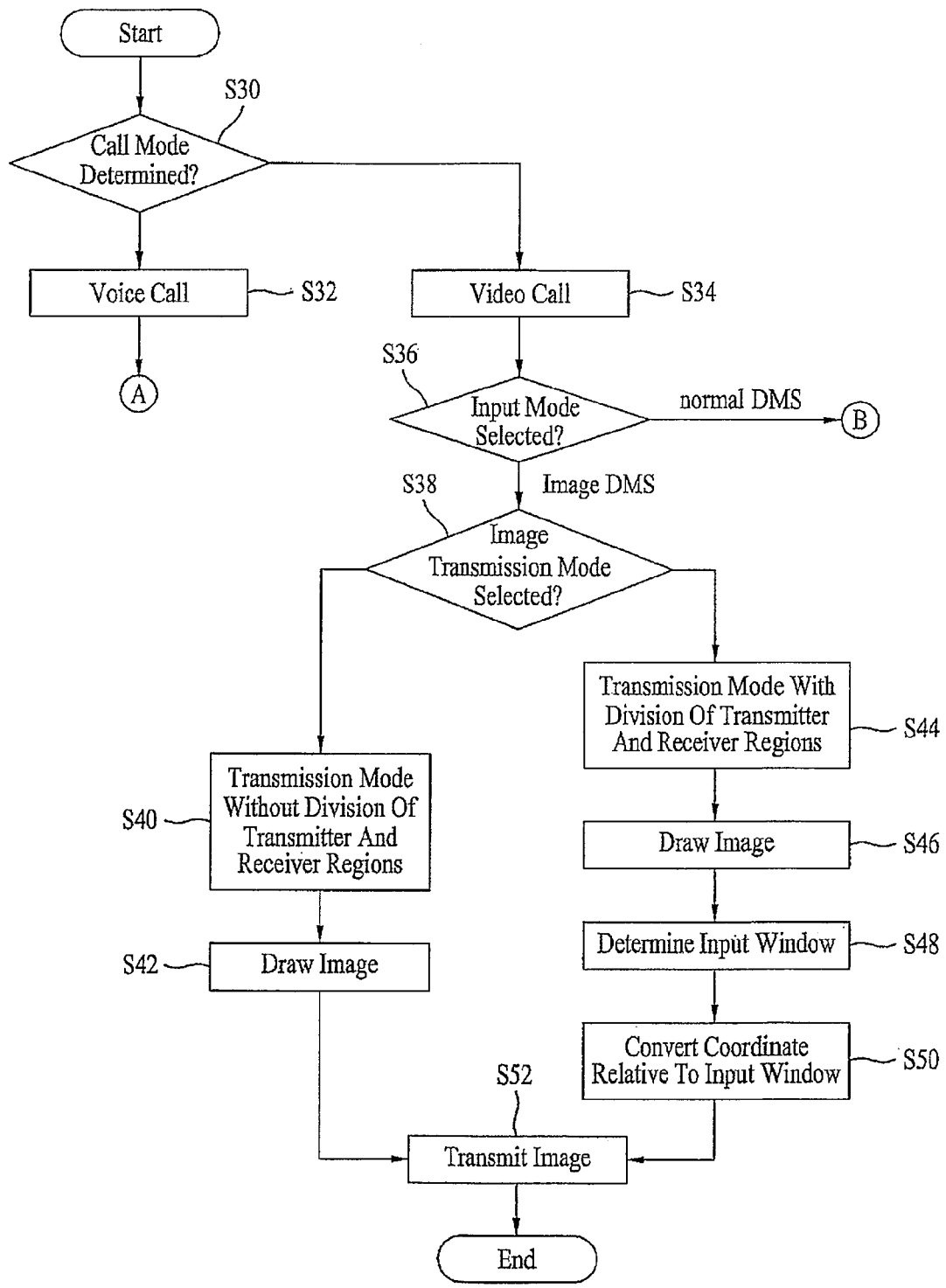

FIGS. 3A and 3B are flowcharts illustrating methods for transmitting image data according to embodiments of the present invention. FIG. 3A shows the method for transmitting the data shown in FIGS. 2A and 2B, and FIG. 3C shows the method of transmitting the data shown in FIGS. 2C and 2D.

In FIG. 3A, the transmitter selects an input mode for transmitting the data (S10). The input mode can be selected by pressing a button or touching the touch screen 9 in the key input unit 10 of the mobile terminal by the transmitter. If the SMS mode shown in FIG. 2A is selected, the controller 6 of the mobile terminal controls switching to the SMS mode (S12). When the transmitter inputs a desired text or inputs a string, which is previously stored, on the screen of the display 8 (S14), the text is controlled to be transmitted to the receiver using the transmission unit 1 (S22).

In FIG. 3A, when the transmitter selects the DMS transmission mode of FIG. 2B as the input mode for transmitting the data, the controller 6 of the mobile terminal controls switching to the DMS mode (S16). When the transmitter completes drawing of a desired image on the touch screen 9 (S18), the image data is controlled to be compressed to data having a predetermined size using the data compression unit 4 (S20). Thereafter, the controller 6 controls the compressed image to be transmitted to the receiver using the transmission unit 1 (S22). The compression of the image data is performed according to a data size allowed in the SMS mode. That is, in the present embodiment, the normal DMS transmission is characterized in that the same transmission mode as the SMS transmission is used in consideration of the compatibility with the existing system and the convenience of design. Accordingly, if the normal DMS transmission is designed to operate in the transmission mode different from that of the SMS transmission mode, the process of compressing the data may be omitted or a compression rate may be adjusted.

Although the step of specifying the receiver (e.g., the input of the phone number of the receiver) is omitted in FIG. 3A, for example, the step of specifying the receiver may be added before step S10 or after step S14 or S20, according to the kinds of the mobile terminal of the transmitter.

FIG. 3B shows the method for transmitting the image data according to the embodiment of the present invention and, more particularly, the method for transmitting the image data during the call.

The controller 6 of the mobile terminal determines a current call mode (S30). If it is determined that the current call mode is a voice call mode (S32), the controller 6 performs the method for transmitting the data shown in FIG. 3A from step S10 (A). If it is determined that the current call mode is a video call mode (S34), the controller 6 directs the user to select an input mode. For example, a guide message is provided on the screen of the display 8 so as to allow the transmitter to select the input mode. If the transmitter selects a specific image data input mode (S36), the controller 6 controls image data to be transmitted in the specific input mode. For example, if the transmitter selects the normal DMS transmission mode, steps S16, S18, S20 and S20 of FIG. 3A are sequentially performed (B).

If the transmitter selects the image DMS mode, the controller 6 controls the transmitter to select an image transmission mode (S38). That is, as described with reference to FIGS. 2C and 2D, the transmitter selects any one of the mode without division of the transmitter and receiver regions (FIG. 2C) and the mode with division of the transmitter and receiver regions (FIG. 2D). If the transmitter selects the mode without division of the transmitter and receiver regions (S40), the controller 6 controls the transmitter to transmit content obtained by drawing an image on the touch screen 9 to the receiver using the transmission unit 1 (S52). At this time, the controller 6 transmits the image content drawn by the transmitter on the screen of the display as a general coordinate regardless of the transmitter and receiver regions. If the transmitter selects the mode with division of the transmitter and receiver regions (S44), the controller 6 determines in which input window the transmitter draws the image on the touch screen 9 (S46) (S48). That is, the controller determines whether the input window specified by the transmitter is the transmitter image region or the receiver image region (S48), the controller controls the drawn image to be represented by a coordinate relative to the input window (the transmitter image region or the receiver image region) (S50) and controls the image to be transmitted using the transmission unit 1 (S52). The detailed format of the transmitted data and the coordinate representation method will be described later.

If the image transmission mode is the mode with division of the transmitter and receiver regions, various methods are applicable to the transmission of the image generated in the image DMS mode and the region-based image data. For example, if an image is desired to be displayed in the receiver region, the image data to be transmitted (that is, the transmitter image data) and the above image may be transmitted in a state of being divided. If an image is desired to be displayed in the transmitter region, the image data to be transmitted (that is, the transmitter image data) and the above image may be transmitted in a state of being combined (mixed). That is, the data 11a generated by the image information generator 11 and the data 9a generated by the touch screen 9 described with reference to FIG. 1 are combined and processed by the digital signal processor 3.

Although a detailed description is omitted in FIG. 3B, it will be apparent that text data can be transmitted in the SMS mode during the voice call. That is, if the transmitter selects the SMS mode in step S36 (not shown), the text data may be transmitted in steps S12, S14 and S22 of FIG. 3A.

Figure 4A:
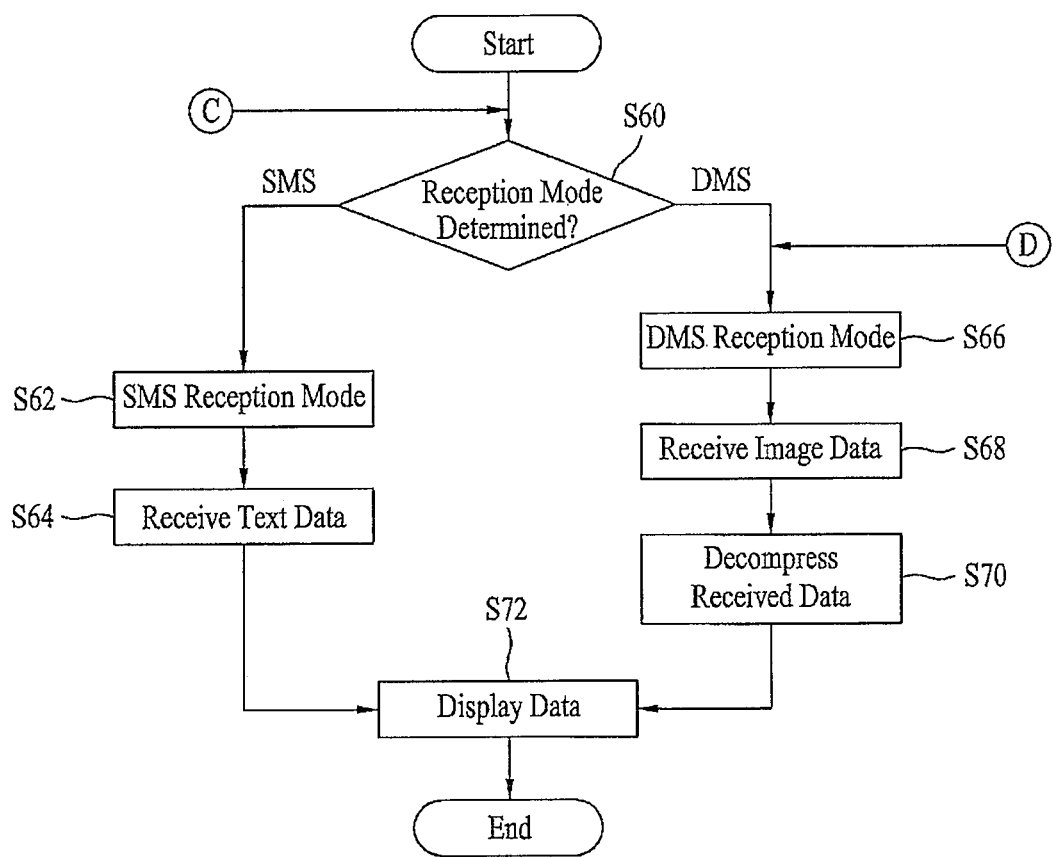
FIGS. 4A and 4B are flowcharts illustrating methods for receiving image data according to an embodiment of the present invention.
Figure 4B:
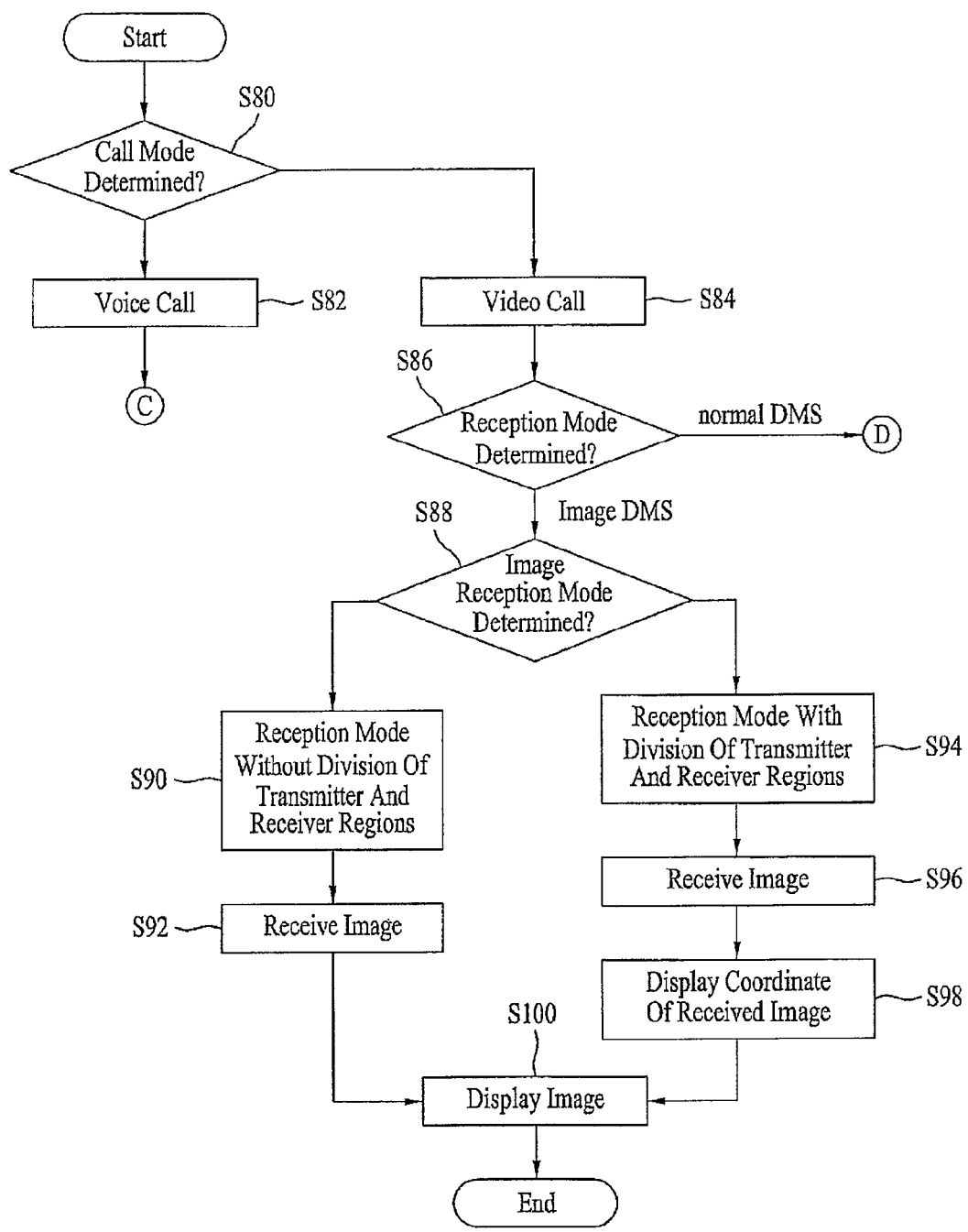

FIGS. 4A and 4B are flowcharts illustrating methods for receiving image data according to an embodiment of the present invention. FIG. 4A shows a receiving method corresponding to the method for transmitting the data shown in FIG. 3A and FIG. 4B shows a receiving method corresponding to the method for transmitting the data shown in FIG. 3B.

In FIG. 4A, the controller 6 determines a reception mode for receiving data (S60). The determination of the reception mode is made in association with the input mode selected by the transmitter. For example, as shown in FIG. 5A, the determination of the reception mode may be easily performed by a data transmission mode identifier included in the received data, which will be described in detail later.

According to the transmitting method of FIG. 3A, if the data received in the same transmission format is in the SMS mode including text, the controller 6 of the mobile terminal controls switching to the SMS reception mode (S62), and the received text data (S64) is displayed on the screen of the display 8 so as to be provided to the receiver (S72).

If the data received in the same transmission format is in the DMS mode including image data, the controller 6 of the mobile terminal controls switching to the DMS reception mode (S66), and the received image data (S68) is decompressed (S70) and is displayed on the screen of the display 8 so as to be provided to the receiver in the image display mode for displaying the image (S72).

FIG. 4B shows the method for receiving the image data according to the embodiment of the present invention and, more particularly, the method for receiving the image during the call.

The controller 6 of the mobile terminal determines a current call mode (S80). If the current call mode is a voice call mode (S82), the controller 6 performs the method for receiving the data shown in FIG. 4A from step S60 (C). If the current call mode is the video call mode (S84), the controller 6 determines a reception mode for receiving data (S86). The determination of the reception mode is performed in association with the input mode selected by the transmitter. For example, as shown in FIG. 5B, the reception mode may be easily determined by a data transmission mode identifier included in the received data, which will be described in detail later.

For example, if the received image data is in the normal DMS, the controller 6 controls steps S66, S68, S70 and S72 shown in the FIG. 4A to be sequentially performed (D). If the received image data is in the image DMS mode, the controller 6 determines an image reception mode (S88). The image reception mode is divided into the mode without division of the transmitter and receiver regions (FIG. 2C) and the mode with division of the transmitter and receiver regions (FIG. 2D), as described above. The determination of the image reception mode is performed in association with the image transmission mode selected by the transmitter. For example, as shown in FIG. 5D, the image reception mode may be easily determined by an image transmission mode identifier included in the received data, which will be described in detail later.

If the received image reception mode is the mode without division of the transmitter and receiver regions (S90), the controller 6 displays the received image data (S92) on the display 8 without change (S100). If the received image reception mode is the mode with division of the transmitter and receiver regions (S94), the controller 6 analyzes the display coordinate of the received image data (S96) (S98). That is, if the transmitter desires to display the image in a specific region (e.g., the transmitter image region or the receiver image region), the relative coordinate is analyzed in order to display the image in the region desired by the transmitter. According to the analyzed coordinate result, the image is displayed on the display 8 in the specific region (S100). FIG. 6 shows an example of the method for receiving the image according to the embodiment of the present invention. For example, it is assumed that the transmitter draws an image in a receiver image region 40a and transmits the image to the receiver. At this time, if only a transmitter image region 50b is displayed on the initial screen of the display 8 of the mobile terminal of the receiver, the controller 6 of the mobile terminal of the receiver which receives the image data controls both the transmitter image region 50b and the receiver image region 40b to be displayed on the screen of the display 8 by changing the screen of the display 8, and controls the received image data to be displayed in the region desired by the transmitter (for example, the receiver image region 40b).

FIGS. 5A and 5B are views showing data formats according to an embodiment of the present invention.

FIG. 5A shows the data format for transmitting the above-described normal DMS mode, in which the SMS mode data format and the normal DMS mode data format are equal. Generally, the data format is divided into a header portion 200 and a data portion 202. General information associated with data transmission is included in the header portion 200. Data suitable for the type of data to be transmitted is included in the data portion 202. For example, data type information 201 in the header portion 200 has an identification function for identifying the type of data to be transmitted. For example, if the data type information value is "Type=0", the data to be transmitted is normal SMS data, if the data type information value is "Type=1", the data to be transmitted is voice SMS data, and, if the data type information value is "Type=2", the data to be transmitted is normal DMS data. The data type information values are examples, and other values may be used.

The data in the data portion 202 is defined in association with the data type information value. For example, the SMS data is included if the data type information value is "Type=0 or 1", the DMS data is included if the data type information value is "Type=2". At this time, the data size is compressed to a size capable of being included in the data portion 202, in order to implement the embodiment of the present invention in which the DMS data is transmitted in the SMS format.

As described above, the data type information 201 in the data format is transmitted together when the data is transmitted in FIGS. 3A and 3B, and is used when the reception mode is determined in FIGS. 4A and 4B.

FIG. 5B shows the data format for transmitting the above-described image DMS mode. Generally, the data format during the video call is divided into a video call data region (210, also referred to as "primary traffic") and a user data region (220, also referred to as "secondary traffic"). In particular, the user data region 220 includes information associated with the video call. In the present embodiment, an image transmission mode identifier 221 is included in the user data region 220. For example, the image transmission mode is defined by "Image_DMS_id" 221. The image which is stored in the memory 7 of the mobile terminal in advance is transmitted if "Image_DMS_id=000", the image directly drawn by the user (transmitter) is transmitted without division of the transmitter and receiver regions if "Image_DMS_id=100", the image directly drawn by the user (transmitter) is transmitted and the image drawn in the transmitter image region is transmitted if "Image_DMS_id=101", and the image directly drawn by the user (transmitter) is transmitted and the image drawn in the receiver image region is transmitted if "Image_DMS_id=110". This is only exemplary and the identifier value may be variously defined.

As described above, the image transmission identifier 221 in the data format is transmitted together when the data is transmitted after the image transmission mode is selected (S38) in FIG. 3B, and is used when the image reception mode is determined (S88) in FIG. 4B.

Figure 7A:
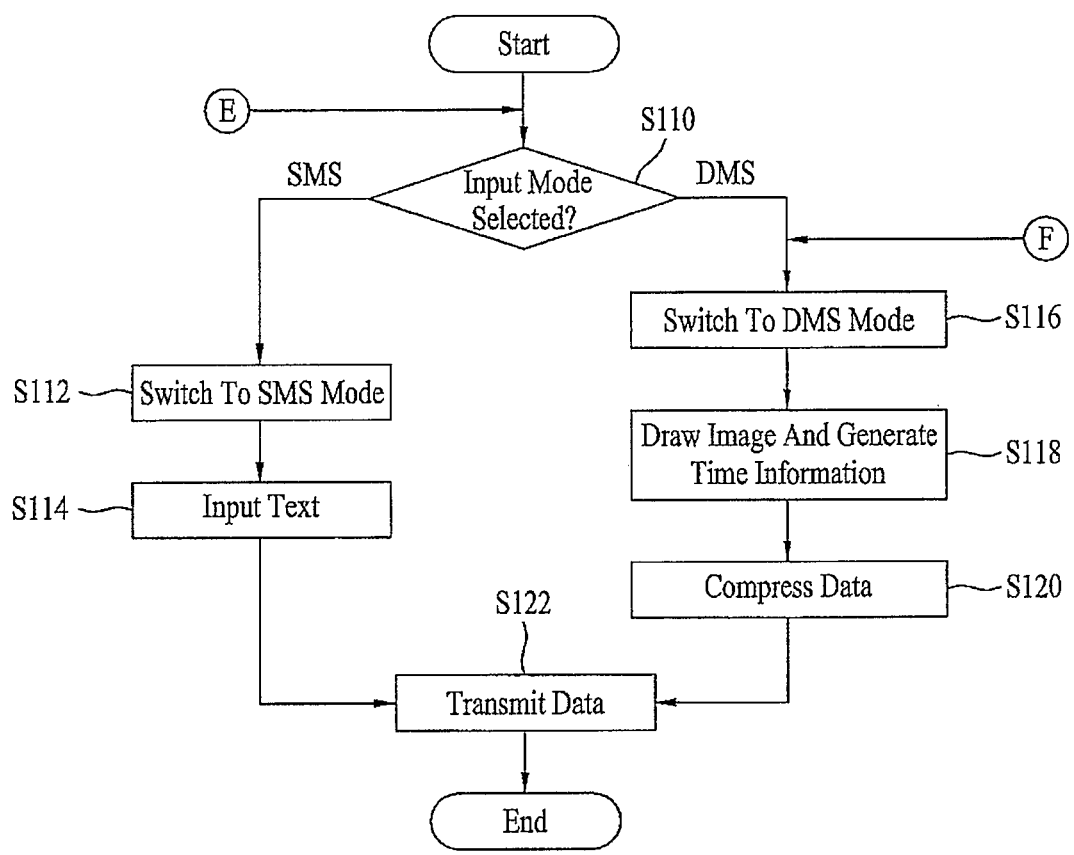
FIGS. 7A and 7B are flowcharts illustrating methods for transmitting image data according to another embodiment of the present invention.
Figure 7B:
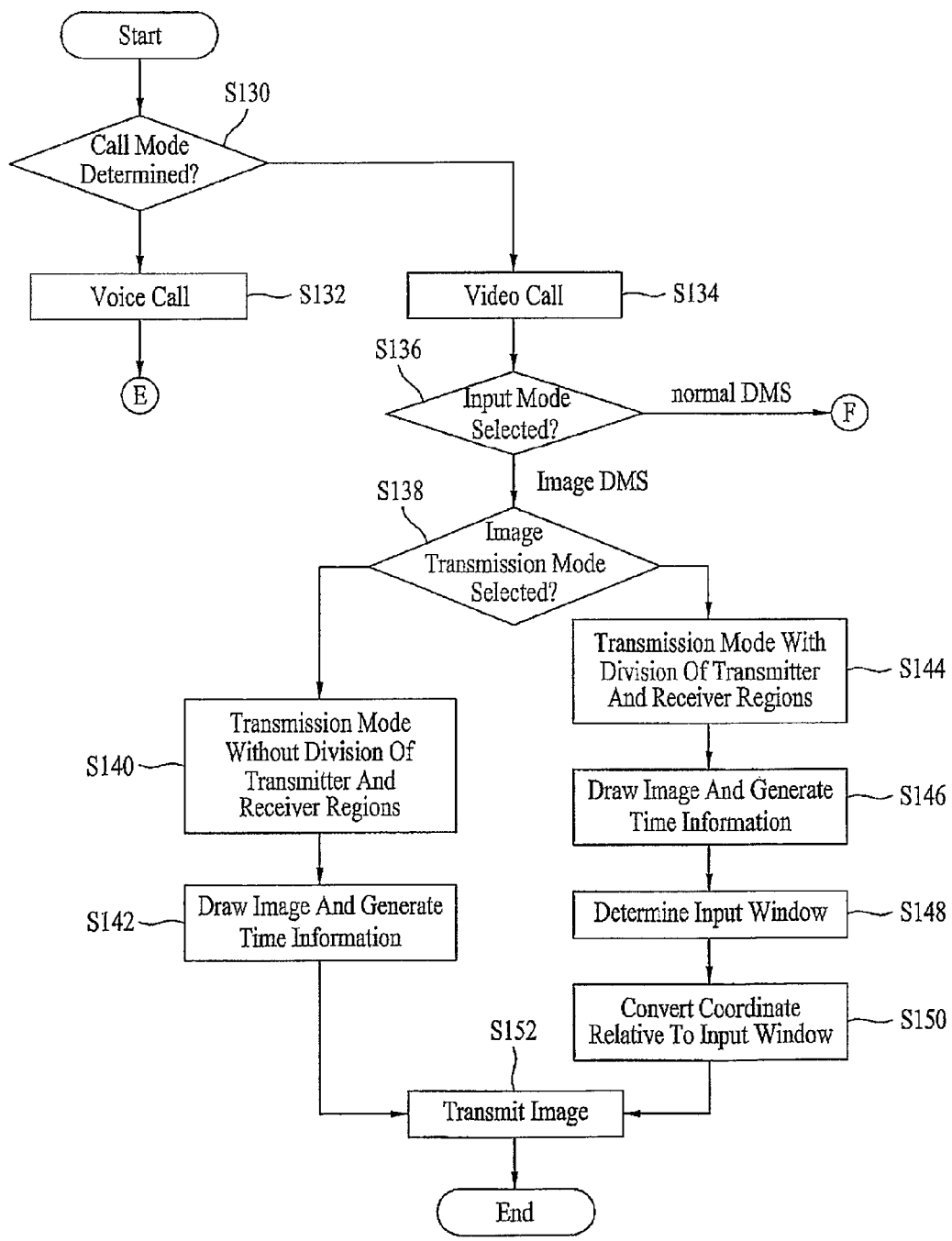

FIGS. 7A and 7B are views showing methods for transmitting image data according to another embodiment of the present invention. In particular, in the present embodiment, "time information" is considered when an image is transmitted.

The term "lime information" described herein refers to information relatively indicating a time when unit image data configuring overall image data is generated. That is, the image is displayed on the screen of the display of the receiver in the order in which the transmitter draws the image such that feeling of the transmitter when drawing the image may be represented to some extent. For example, the feeling of the transmitter, such as self-confidence, hesitation, or butterflies, may be given to the receiver via the screen displayed by referring to the time information. The detailed examples of a method of constructing a data format including time information, a transmitting method and a receiving method will be described in detail with reference to FIGS. 9A to 12B. That is, the time information is used to generate a dynamic image. Accordingly, the time image is used to show the image being drawn.

FIG. 7A shows an example of the method for transmitting image data including time information, which is similar or equal to the method of the FIG. 3A, except for step S118 of generating the time information together when the image is drawn and step S122 of transmitting the time information together with the image data. For example, step S110 corresponds to step S10, step S112 corresponds to step S12, step S114 corresponds to step S14, step S116 corresponds to step S16, and step S120 corresponds to step S20.

FIG. 7B shows an example of the method for transmitting image data including time information, which is similar or equal to the method of FIG. 3B, except for steps S142 and S146 of generating the time information together when an image is drawn and step S152 of transmitting the time information together with the image data. For example, step S130 corresponds to step S30, step S132 corresponds to step S32, step S134 corresponds to step S34, step S136 corresponds to step S36, step S138 corresponds to step S38, step S140 corresponds to step S40, step S144 corresponds to step S44, step S148 corresponds to step S48, and step S150 corresponds to step S50.

Figure 8A:
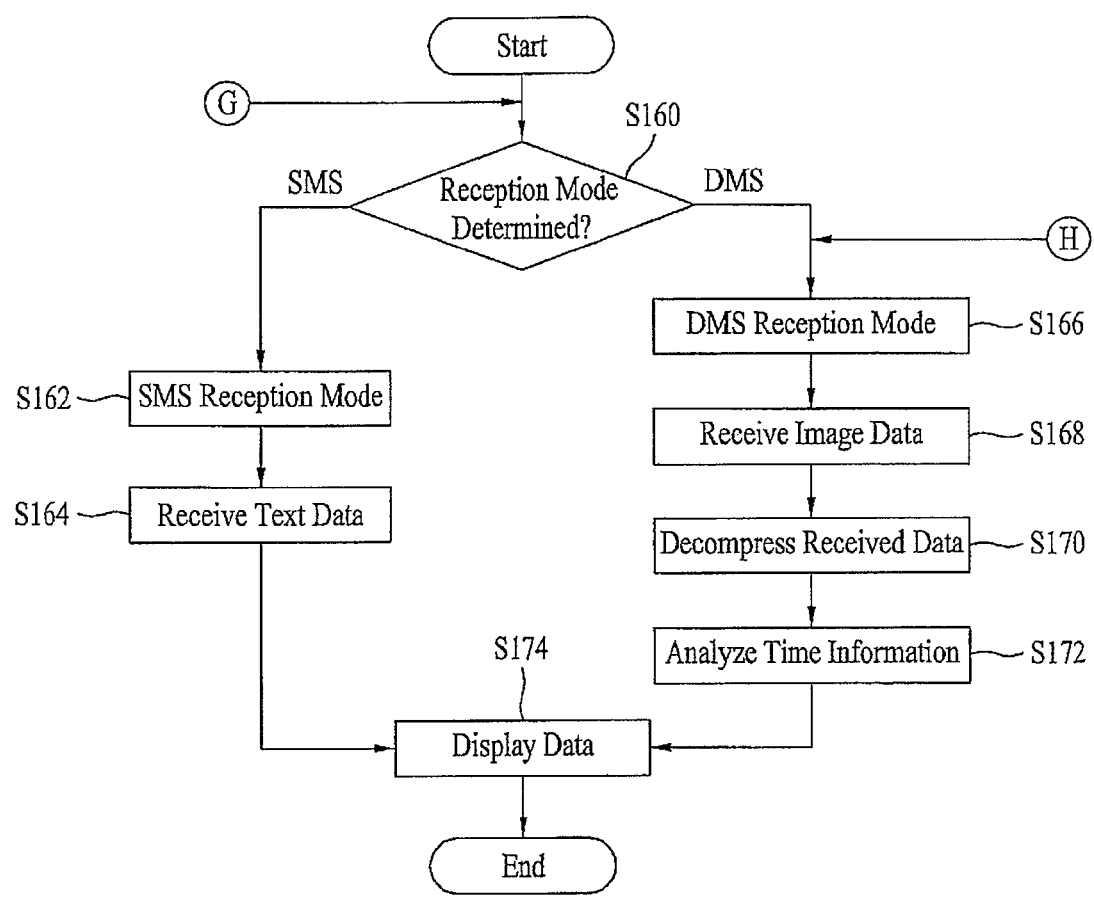
FIGS. 8A and 8B are views showing methods for receiving image data according to another embodiment of the present invention.
Figure 8B:
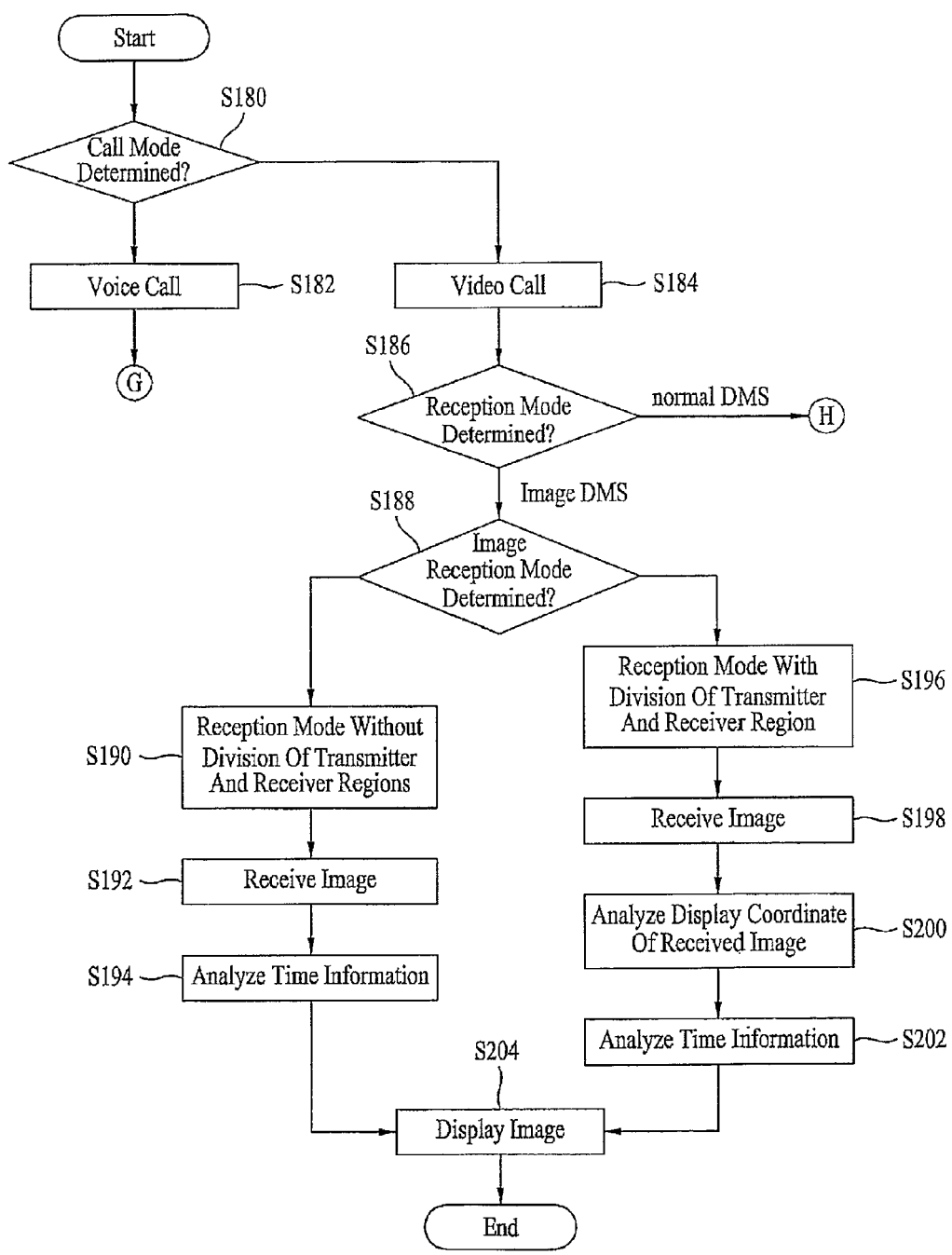

FIGS. 8A and 8B are views showing methods for receiving image data according to another embodiment of the present invention. In particular, in the present embodiment, the image is displayed in consideration of the "time information" received when the image is received.

FIG. 8A shows an example of the method for receiving the image data including the time information and displaying the image data according to the time information, which is similar or equal to the method of FIG. 4A except for step S172 of analyzing the time information included in the received image data and step S174 of displaying the received image data in consideration of the analyzed time information. For example, step S160 corresponds to step S60, step S162 corresponds to step S62, step S164 corresponds to step S64, step S166 corresponds to step S66, step S168 corresponds to step S68, and step S170 corresponds to step S70.

FIG. 8B shows another example of the method for receiving the image data including the time information and displaying the image data according to the time information, which is similar or equal to the method of FIG. 4B except for steps S194 and S202 of analyzing the time information included in the received image data and step S204 of displaying the received image data in consideration of the analyzed time information. For example, step S180 corresponds to step S80, step S182 corresponds to step S82, step S184 corresponds to step S84, step S186 corresponds to step S86, step S188 corresponds to step S88, step S190 corresponds to step S90, step S192 corresponds to step S92, step S196 corresponds to step S94, step S198 corresponds to step S96, and step S200 corresponds to step S98.

Hereinafter, the method of constructing the data format including the time information, the transmitting method and the receiving method will be described with reference to FIGS. 9A to 12B.

FIGS. 9A and 9B are views showing data formats according to another embodiment of the present invention. For convenience of description, FIG. 9A shows the data format obtained by extending the data format of FIG. 5A and FIG. 9B shows the data format obtained by extending the data format of FIG. 5B.

FIG. 9A shows the data format for the normal DMS mode in consideration of the time information, in which the SMS mode data format and the normal DMS mode data format are equal. Generally, the data format is divided into a header portion 300 and a data portion 303. General information associated with data transmission is included in the header portion 300. Data suitable for the type of data to be transmitted is included in the data portion 303. For example, data type information 301 in the header portion 300 has an identification function for identifying the type of data to be transmitted, which may be constructed equally with the data type information 201 of FIG. 5A. In addition, the header portion 300 further includes an identifier for identifying whether or not the time information is included, which is called "Time_Info_id" 302. For example, if the value of the identifier 302 is "Time_Info_id=0", the time information is not included and, if the value of the identifier 302 is "Tim_Info_id=1", the time information is included. The data of the data portion 302 is also defined in association with the data type information value. For example, the SMS data is included if the data type information value is "Type=0 or 1", and the DMS data is included and the data size is compressed to a size capable of being included in the data portion 303 if the data type information value is "Type=2". If "Type=2" and "Time_Info_id=1", the time information of the image data is included in the data portion 303 together. The values of the identifier are examples, and other values may be used.

FIG. 9B shows the data format for the above-described image DMS mode in consideration of the time information. Generally, the data format during the video call is divided into a video call data region (310, also referred to as "primary traffic") and a user data region (320, also referred to as "secondary traffic"). In particular, the user data region 320 includes information associated with the video call. In the present embodiment, an image transmission mode identifier 321 and an identifier for identifying whether or not the time information is included are included in the user data region 320. The image transmission mode identifier 321 may be constructed equally with the image transmission mode identifier 221 of FIG. 5B. The identifier 322 for identifying whether or not the time information included indicates that the time information is not included if "Time_Info_id=0" and the time information is included if "Time_Info_Id=1".

Figure 13A:
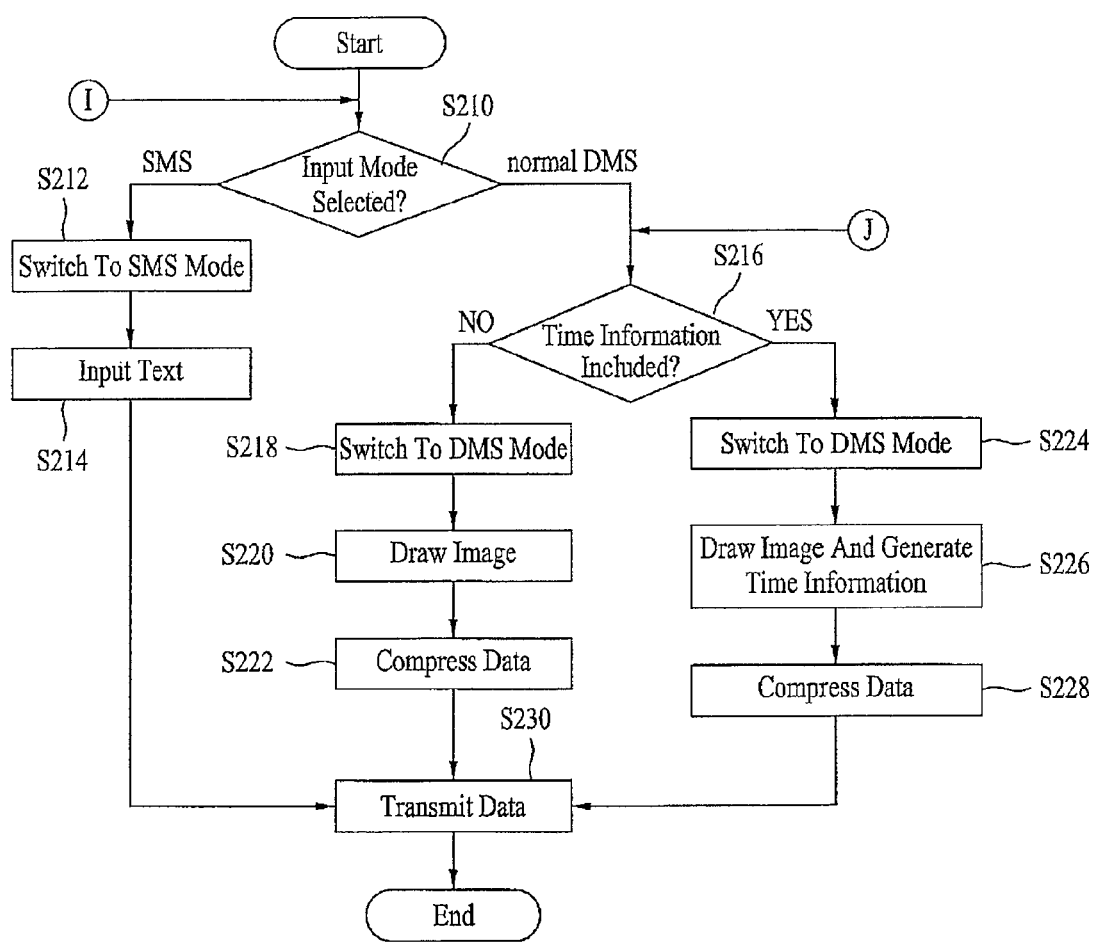
FIGS. 13A and 13B are flowcharts illustrating methods for transmitting image data according to another embodiment of the present invention.
Figure 13B:
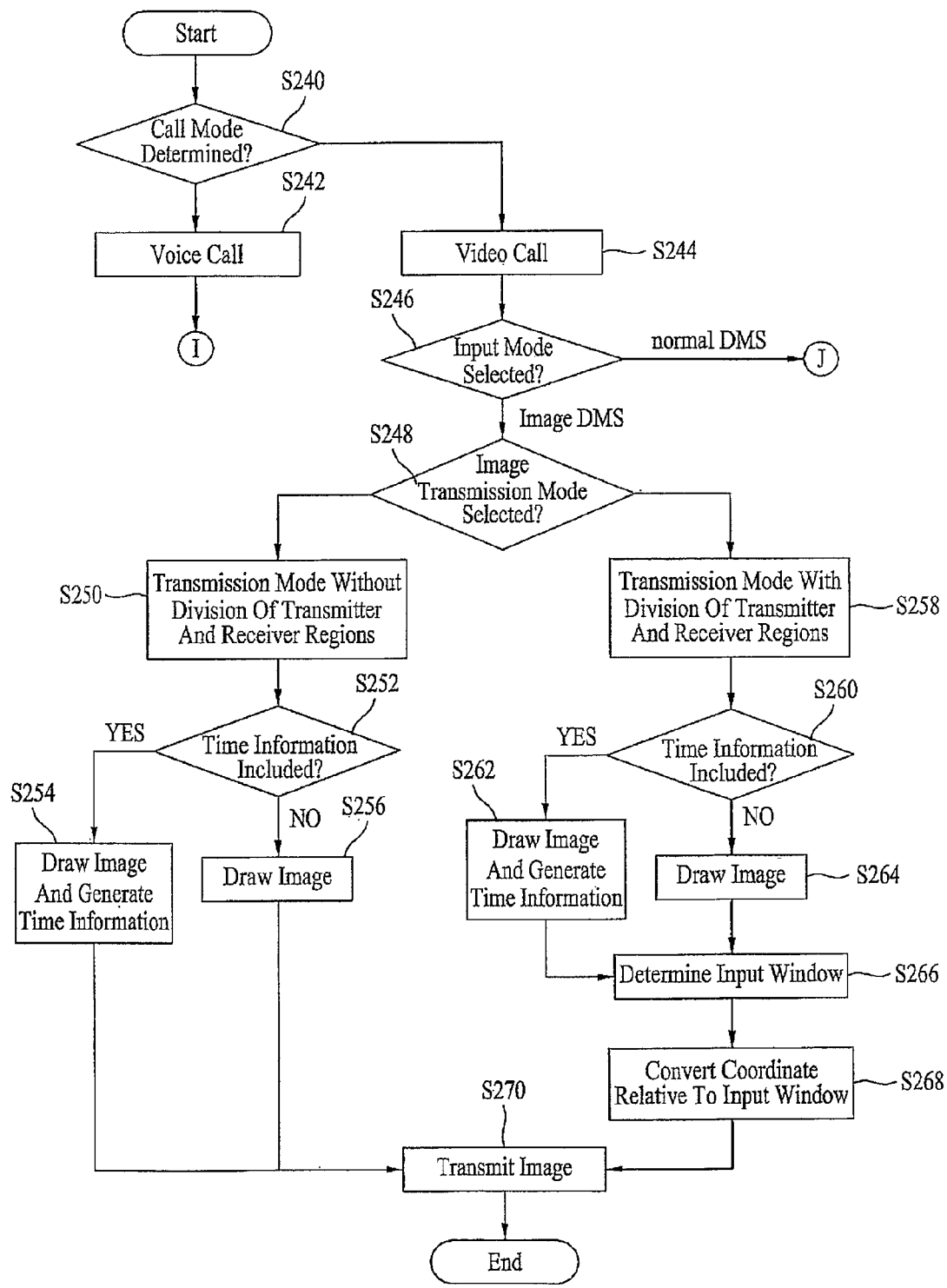
Figure 14A:
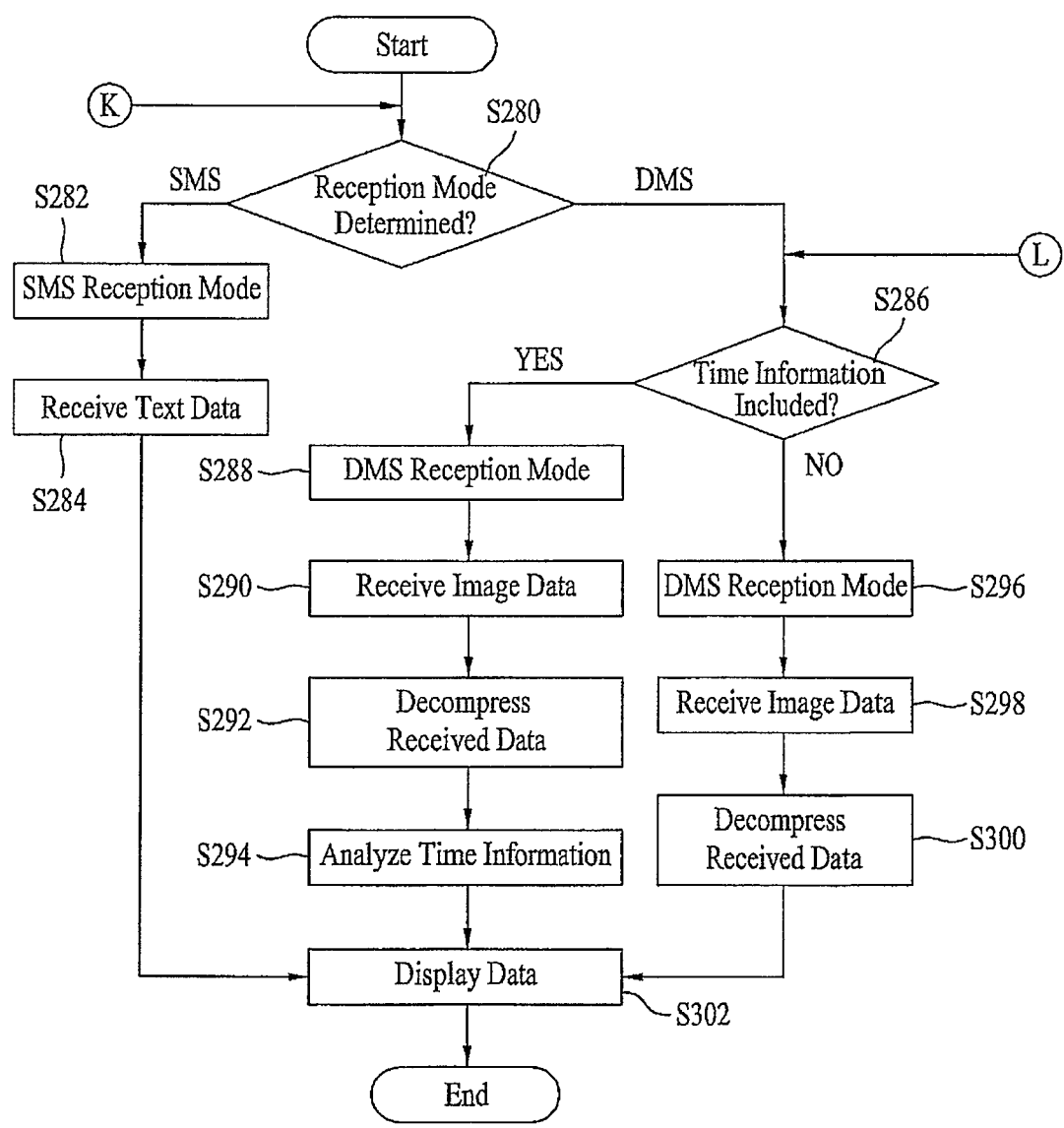
FIGS. 14A and 14B are flowcharts illustrating methods for receiving image data according to another embodiment of the present invention.
Figure 14B:
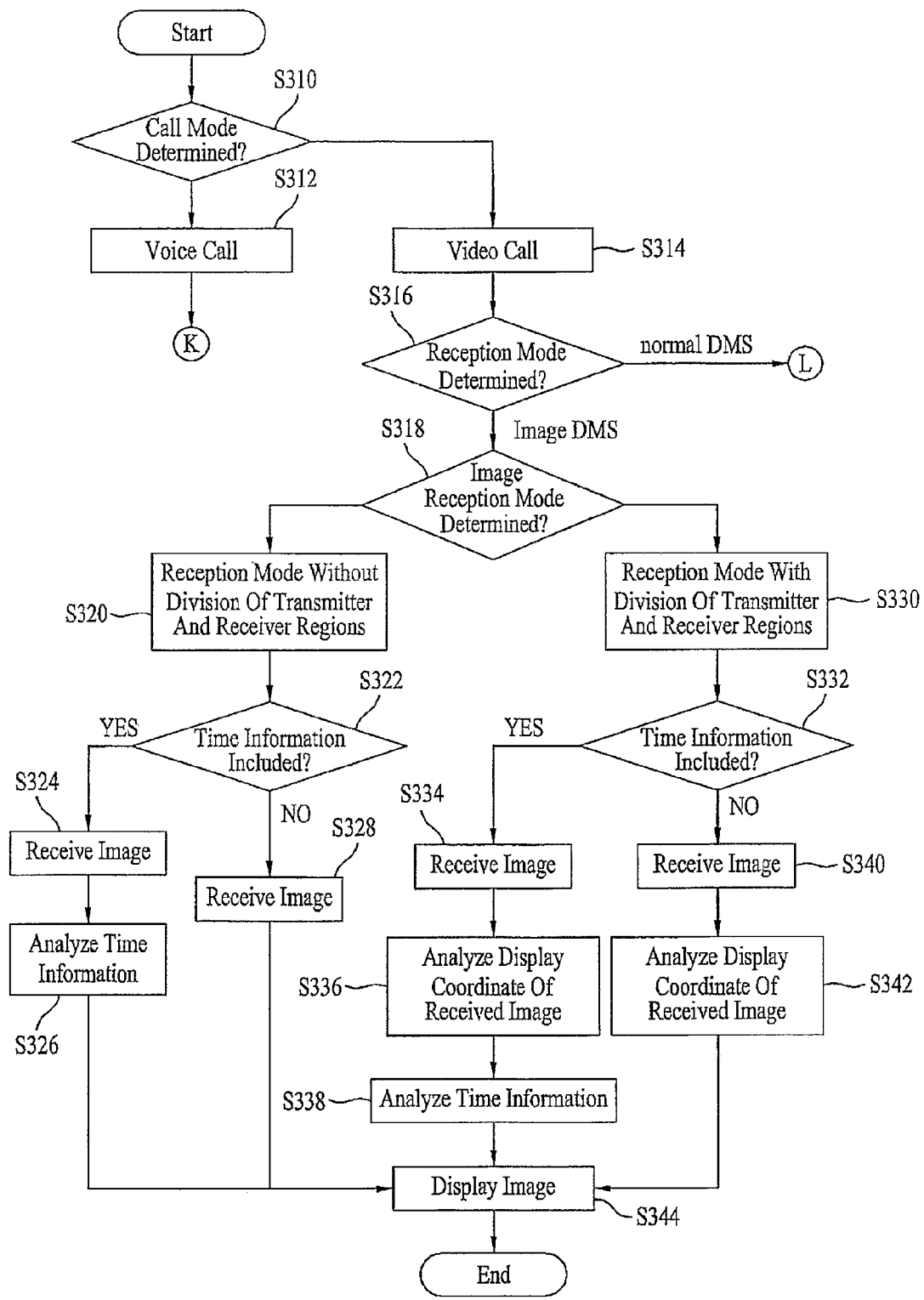

The identifiers 302 and 322 associated with the time information of FIGS. 9A and 9B are transmitted together with the image data of FIGS. 13A and 13B and are used when it is determined whether or not the time information is included in the received image data in FIGS. 14A and 14B. The detailed description of FIGS. 13A to 14B will be given later.

Figure 10A:
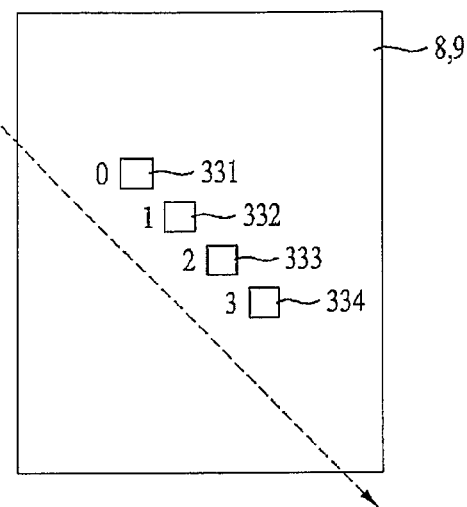
FIGS. 10A to 12B are views showing data formats including time information according to another embodiment of the present invention.
Figure 10B:
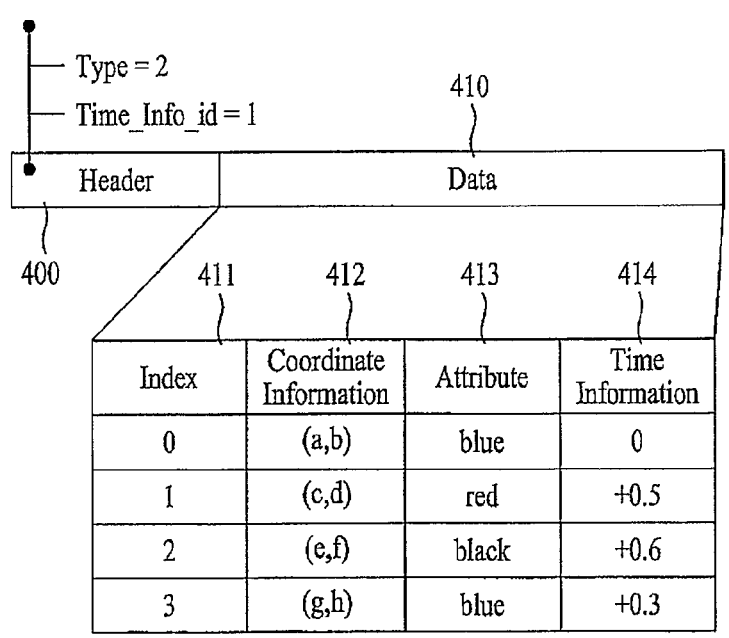

FIGS. 10A to 10B are views illustrating image data including time information. For example, FIG. 10A shows a case where the transmitter time-sequentially draws specific images 331, 332, 333 and 334 on the display 8 using the touch screen 9. FIG. 10A shows images drawn by the transmitter in a direction denoted by a dotted arrow. Data obtained by dividing total image data in time units is called "unit image data", and each of reference numerals 331, 332, 333 and 334, or portions of a larger image, configures the "unit image data".

Whenever the transmitter generates the unit image data, the controller 6 of the mobile terminal generates data information corresponding thereto. FIG. 10B shows an example of a data format including time information and coordinate information. For example, from the data type of "Type=2" and "Time_info_id=1" in the identifier of the header portion 400 of the data format, it can be seen that the normal DMS is included and the time information is included. Accordingly, it can be recognized that the image data including the time information is included in the data portion 410. In FIG. 10B, the coordinate information and the attribute information of the unit image data including the time information is included in the data portion 410. Although not shown in detail in FIG. 10B, it will be apparent that an actual data value of the unit image data is included in the data portion 410.

Information indicating the time-based unit image data (referred to as "unit image data information") may include an index 411, the coordinate information 412, the attribute information 413 and the time information 414.

In detail, for example, the index 411 startes from "0" and is time-sequentially increased by "1" with respect to every "unit image data information".

The coordinate information 412 has a coordinate value of the unit image data located on the screen of the display 8, which may be a two-dimensional coordinate value or a three-dimensional coordinate value. In the transmission mode with division of the transmitter and receiver regions, the coordinate value is analyzed as the coordinate value relative to the input window.

The attribute information 413 is information indicating the attribute of the unit image data. For example, the attribute information may indicate the background color or the line color of the unit image data. It will be apparent that the attribute information 413 may include a variety of information according to the system or the standard used, such as a line thickness, line resolution or others.

The time information 414 indicates the time information of the unit image data and, for example, may be represented by a value relative to previous unit image data. Accordingly, first unit image data having an index value "0" may have a value "0" as the time information, and second unit image data having an index value "1" may have a value "+0.5" as the time information. That is, it is indicated that the second unit image data is delayed from the first unit image data by 0.5 seconds. Similarly, if third unit image data having an index value "2" may have a value "+0.6" as the time information, it is indicated that the third unit image data is delayed from the second unit image data by 0.6 seconds. In addition, if fourth unit image data (final unit image data in the example of FIG. 10B) having an index value "3" may have a value "+0.3" as the time information, it is indicated that the fourth unit image data is delayed from the third unit image data by 0.3 seconds, for example.

Hereinafter, various examples of the method for transmitting and receiving the data including the time information according to the embodiments of the present invention will be described. For example, three methods for transmitting the time information will be described.

First, unit image data including time information is generated and all unit image data is simultaneously transmitted after generation of total image data is completed. In this case, the receiver side simultaneously receives the total image data and then displays the unit image data with time by referring to the time information 414, the coordinate information 412 and the attribute information 413 in the unit image data information. Accordingly, if the image data shown in FIG. 10A is transmitted, the unit image data 331 to 334 is displayed at the same interval of time.

Figure 11A:
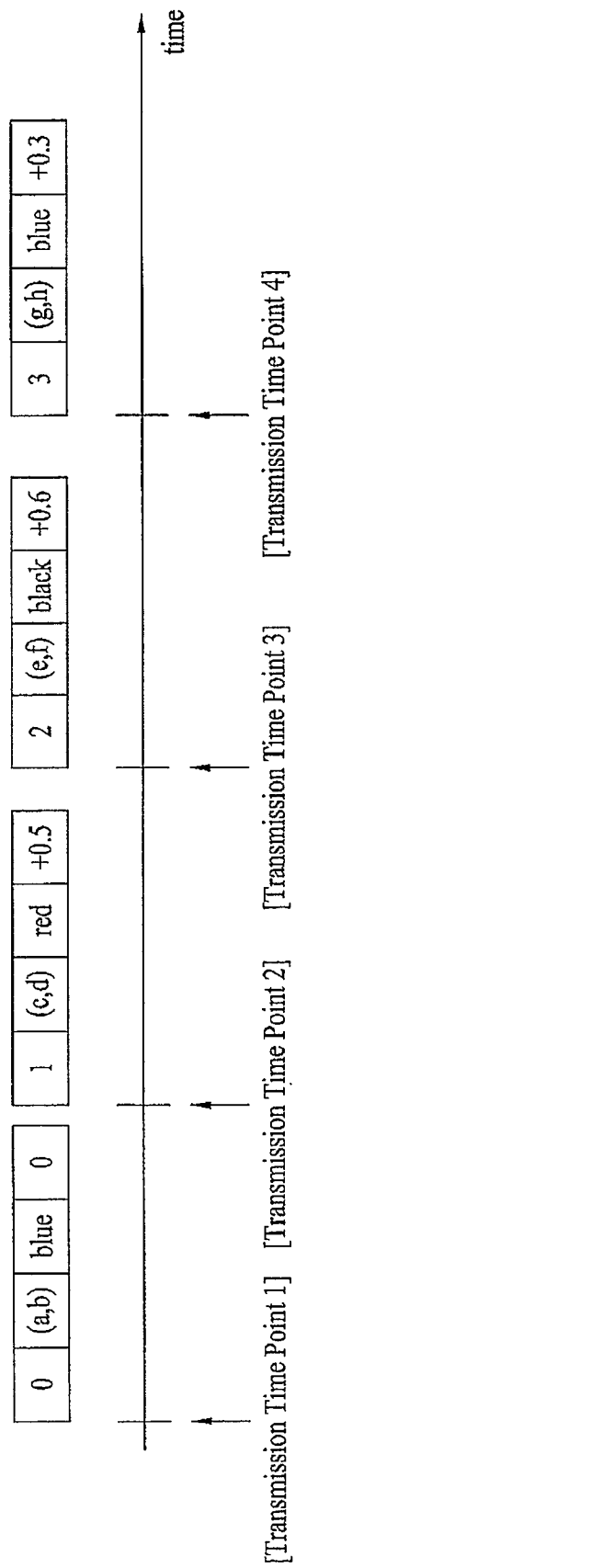
Figure 11B:
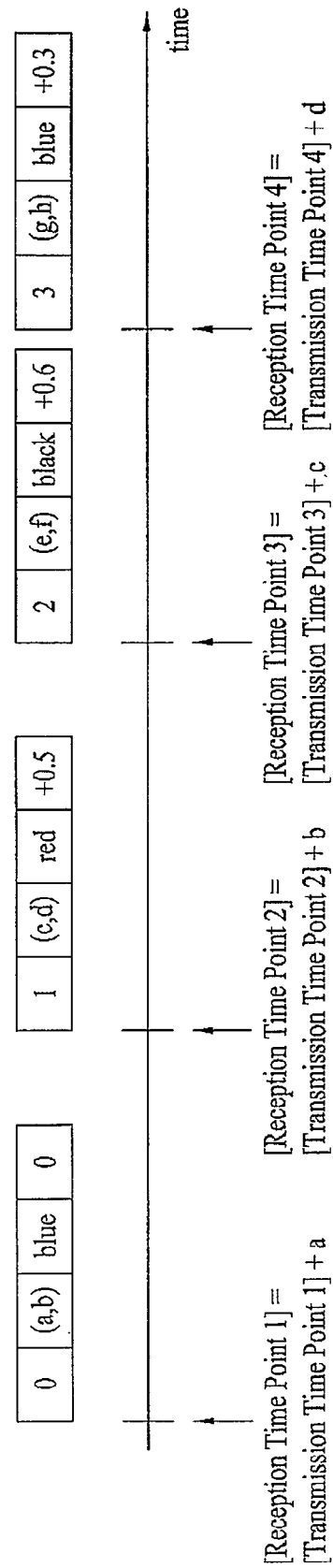

Second, unit image data including time information is generated and is transmitted in real time together with unit image data information associated therewith whenever, or as the unit image data is generated. FIGS. 11A and 11B show transmission and reception of the unit image data information according to the present method, respectively. For example, if the unit image data shown in FIG. 10A is transmitted, the unit image data information is transmitted whenever, or as the unit image data is generated, as shown in FIG. 11A. Accordingly, in order to transmit four pieces of unit image data, four transmission time points 1, 2, 3 and 4 are necessary. FIG. 11B shows the reception of the data transmitted as shown in FIG. 11A. A reception time point 1 indicates that the data is received at a "transmission time point 1+a". At this time, the value "a" indicates a delay value of a communication network at the "transmission time point 1". Accordingly, in the communication environment in which the value "a" is increased, a time difference needs to be considered in the transmitting/receiving method. Similarly, a reception time point 2 indicates that the data is received at a "transmission time point 2+b". At this time, the value "b" indicates a delay value of a communication network at the "transmission time point 2". In addition, a reception time point 3 indicates that the data is received at a "transmission time point 3+c". At this time, the value "c" indicates a delay value of a communication network at the "transmission time point 3". In addition, a reception time point 4 indicates that the data is received at a "transmission time point 4+d". At this time, the value "d" indicates a delay value of a communication network at the "transmission time point 4". By the above-described transmitting method, the total delay time of the communication network is "a+b+c+d". As the delay value is increased, a display having time information different from the time information desired by the transmitter may be obtained. Accordingly, the present method is more suitable for an environment in which the communication delay value (e.g., "a+b+c+d") is smallest.

Figure 12A:
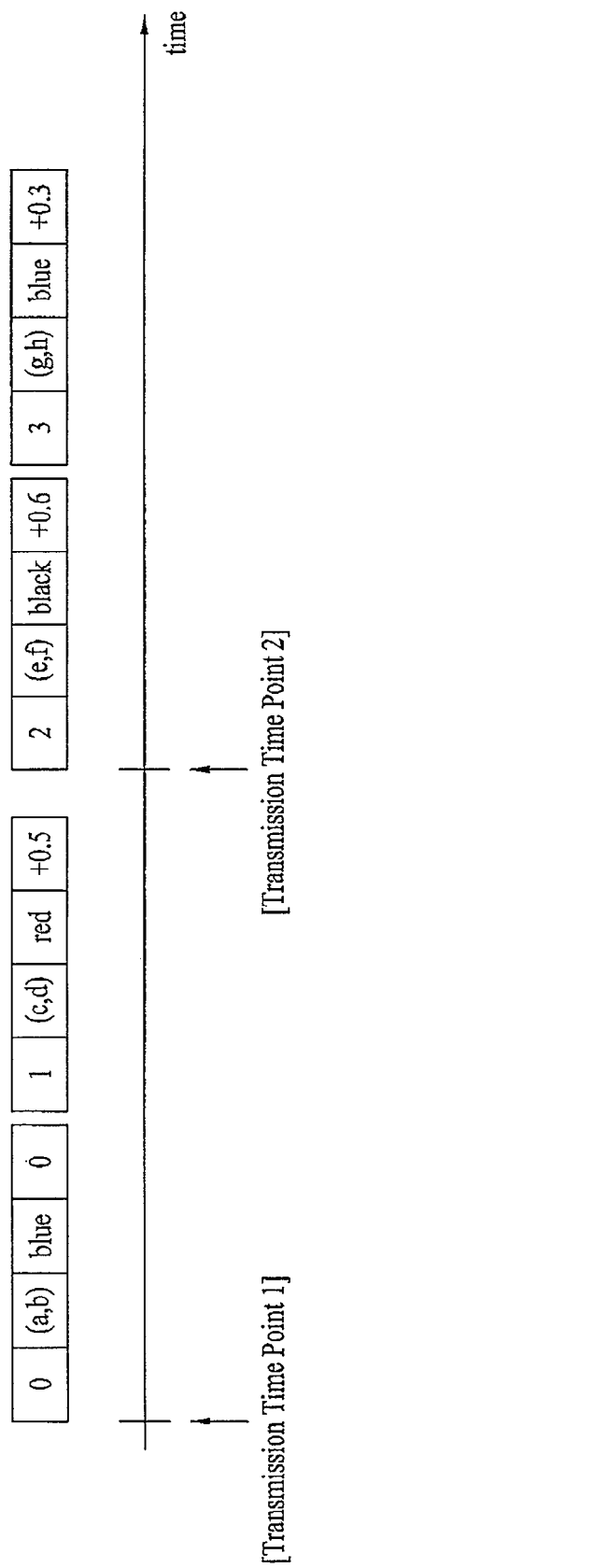
Figure 12B:
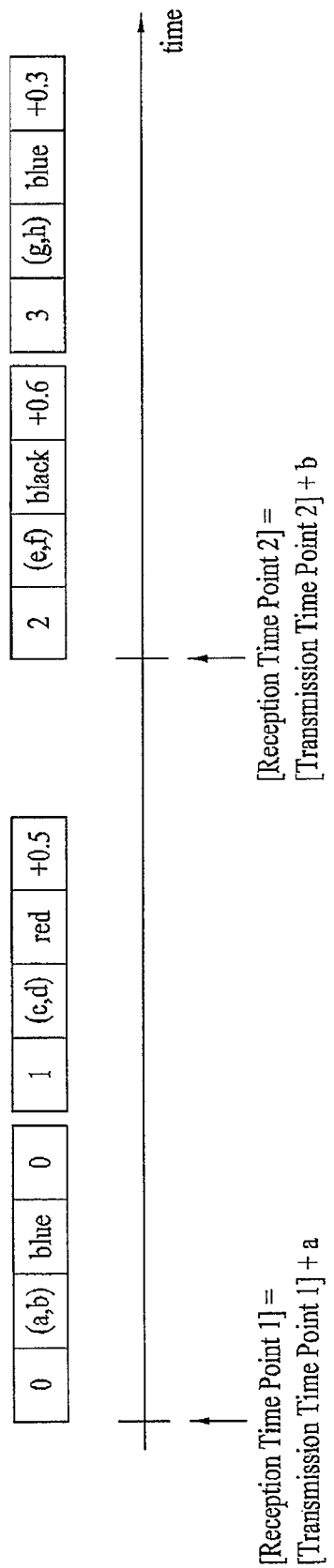

Third, unit image data including time information is generated, and a group of several pieces of unit image data is transmitted together with unit image data information associated therewith. FIGS. 12A and 12B show transmission and reception of unit image data information according to the present method, respectively. For example, if the unit image data shown in FIG. 10A is transmitted, as shown in FIG. 12A, two pieces of unit image data (having index values "0" and "1") are grouped and transmitted together with data information associated therewith whenever two pieces of unit image data are generated. Accordingly, in order to transmit four pieces of unit image data, two transmission time points 1 and 2 are necessary. FIG. 12B shows the reception of the data transmitted as shown in FIG. 12A. A reception time point 1" indicates that data is received at "transmission time point 1+a". At this time, the value "a" indicates a delay value of a communication network at the "transmission time point 1". Similarly, a "reception time point 2" indicates that data is received at "transmission time point 2+b". At this time, the value "b" indicates a delay value of a communication network at the "transmission time point 2". By the above-described transmitting method, the total delay time of the communication network is "a+b". This method is advantageous that the communication delay time is smaller than that of the second method.

As a result, it is preferable that the most efficient one of the three methods suggested as the method for transmitting the time information be selected according to the communication environment and the intention of the transmitter who draws an image.

In the embodiment of FIGS. 10A to 12B, both the time information and the coordinate information are used to represent the image data together. However, in another embodiment, only the coordinate information can be used to represent the image data. For example, if a JPEG image stored in a transmitter mobile is used to a background image and a user intends to draw (or sketch) a user image on the background image, only the coordinate information, indicating coordinate values X,Y of the user image associated with the background image, can be generated to represent the user image.

In more details, the coordinate information can be generated by using a Comment Marker of the JPEG image. It is well known to be able to use a Comment Marker to represent additional data for JPEG image. For example, the Comment Marker for the coordinate information can be stored in the transmitter mobile following the compressed JPEG data representing the JPEG image.

If a total data size which is combined the Comment Marker with the compressed JPEG data is not exceed from a predetermined value (e.g., 1.1 Mbytes), the transmitter mobile transmit the combined data including the Comment Marker and the compressed JPEG data to a receiver mobile. But, if the total data size which is combined the Comment Marker with the compressed JPEG data is exceed from a predetermined value (e.g., 1.1 Mbytes), the transmitter mobile further compress the Comment Marker to reduce the total data size under the predetermined value. Afterward, the transmitter mobile transmit the combined data including the compressed Comment Marker and the compressed JPEG data to a receiver mobile.

FIGS. 13A and 13B are flowcharts illustrating methods for transmitting image data according to another embodiment of the present invention. The present embodiment further include step of selecting whether or not the time information is included, in order to provide an environment in which the transmitter can more efficiently transmit image data.

In FIG. 13A, the transmitter selects an input mode for transmitting data (S210). The input mode can be selected by pressing the button or touching the touch screen 9 of the key input unit 10 of the mobile terminal. If the SMS mode is selected as shown in FIG. 2A, the controller 6 of the mobile terminal controls switching to the SMS mode (S212). If the transmitter inputs desired text or selects a string, which is previously stored, on the screen of the display 8 (S214), the text is controlled to be transmitted to the receiver using the transmission unit 1 (S230).

In FIG. 13A, if the user selects the normal DMS transmission for the image data shown in FIG. 2B as the input mode for transmitting data, the controller 6 of the mobile terminal controls the transmitter to select whether or not the time information is included in the image data (S216).

If the transmitter selects that the time information is not included, the controller 6 controls switching to the DMS mode (S218). If the transmitter completes the operation for drawing the image on the touch screen 9 (S220), the image data is controlled to be compressed into data having a specific size using the data compression unit 4 (S222). Thereafter, the controller 6 controls the compressed image to be transmitted to the receiver using the transmission unit 1 (S230).

If the transmitter selects that the time information is included, the controller 6 controls switching to the DMS mode (S224), and controls the transmitter to perform the operation for drawing a desired image on the touch screen 9 and generates time information (S226). Thereafter, the controller 6 controls the image data to be compressed into data having a specific size using the data compression unit 4 (S228) and controls the compressed image to be transmitted to the receiver using the transmission unit 1 (S230). In step S230, according to the above-described method for transmitting the time information, all image data may be simultaneously transmitted, unit image data may be transmitted together with the time information whenever, or as the unit image data is generated, or the group of several pieces of unit image data may be transmitted together with the time information. The method for transmitting the time information may be determined according to the communication environment or the requirement of the transmitter.

In FIG. 13B, the controller 6 of the mobile terminal determines a current call mode (S240). If it is determined that the current call mode is a voice call mode (S242), the controller 6 performs the method for transmitting the data shown in FIG. 13A from step S210 (I). If it is determined that the current call mode is a video call mode (S244), the controller 6 controls the user to select an input mode (S246). For example, a guide message is provided on the screen of the display 8 so as to allow the transmitter to select the input mode. If the transmitter selects a specific image data input mode, the controller 6 controls image data to be transmitted in the input mode. For example, if the transmitter selects the normal DMS transmission mode, the method of FIG. 13A is performed from step S216 (J).

If the transmitter selects the image DMS mode, the controller 6 controls the transmitter to select an image transmission mode (S248). That is, as described with reference to FIGS. 2C and 2D, the transmitter selects any one of the mode without division of the transmitter and receiver regions (FIG. 2C) and the mode with division of the transmitter and receiver regions (FIG. 2C).

If the transmitter selects the mode without division of the transmitter and receiver regions (S250), the controller 6 controls the transmitter to select whether or not the time information is included in the image data (S252). If the transmitter selects that the time information is not included, the controller 6 controls the transmitter to draw an image (S256) and transmits the drawn image using the transmission unit 1 (S270). If the transmitter selects that the time information is included, the controller 6 controls the transmitter to draw an image, generates the time information (S254), and transmits the drawn image using the transmission unit 1 (S270). At this time, the controller 6 transmits the image content drawn by the transmitter on the screen of the display as a general coordinate regardless of the transmitter and receiver regions. The method for transmitting the time information is performed by any one of the above-described three methods.

If the transmitter selects the mode with division of the transmitter and receiver regions (S258), the controller 6 controls the transmitter to select whether or not the time information is included in the image data (S260). If the transmitter selects that the time information is not included, the controller 6 determines to which input window image content obtained by drawing an image on the touch screen 9 by the transmitter (S264) corresponds (S266). That is, it is determined whether the input window specified by the transmitter is the transmitter image region or the receiver image region (S266), the drawn image is represented by a coordinate relative to the input window (the transmitter image region or the receiver image region) (S268), and the image is transmitted to the receiver using the transmission unit 1 (S270). The detailed format of the transmitted data and the method for representing the coordinate are described above. If the transmitter selects that the time information is included, the controller 6 controls the transmitter to draw an image on the touch screen 9 and generates the time information (S262). The process of sequentially performing steps S266, S268 and S270 is equal to the above-described process. The method for transmitting the time information is performed by any one of the above-described three methods.

FIGS. 14A and 14B are flowcharts illustrating methods for receiving image data according to another embodiment of the present invention. FIG. 14A shows the receiving method corresponding to the method for transmitting the data shown in FIG. 13A and FIG. 14B shows the receiving method corresponding to the method for transmitting the data shown in FIG. 13B.

In FIG. 14A, the controller 6 determines a reception mode for receiving data (S280). The determination of the reception mode is made in association with the input mode selected by the transmitter. For example, as shown in FIG. 9A, the reception mode may be easily determined by the data transmission mode identifier 301 included in the received data.

If the data received in the same transmission format is in the SMS mode including text, the controller 6 of the mobile terminal controls switching to the SMS reception mode (S282), and the received text data (S284) is displayed on the screen of the display 8 so as to be provided to the receiver (S302).

If the data received in the same transmission format is in the DMS mode including image data, the controller 6 of the mobile terminal determines whether or not the time information is included (S286). It is determined whether or not the time information is included, by the identifier 302 for identifying whether or not the time information is included, in the data format of FIG. 9A. If the time information is not included, the controller 6 controls switching to the DMS reception mode (S296), and the received image data (S298) is decompressed (S300) and is displayed on the screen of the display 8 so as to be provided to the receiver (S302). At this time, the controller 6 may use an image display mode for displaying the received image data, which can be supported by a separate device or software program, as described above. If the time information is included in the received data, the controller 6 controls switching to the DMS reception mode (S288), the received image data (S290) is decompressed (S292), and the time information of the data is analyzed (S294). The controller 6 controls the received image to be displayed on the screen of the display 8 according to the analyzed time information (S302).

In FIG. 14B, the controller 6 of the mobile terminal determines a current call mode (S310). If the current call mode is a voice call mode (S312), the controller 6 controls the method for receiving the data shown in FIG. 14A to be performed from step S280 (K). If the current call mode is the video call mode (S314), the controller 6 determines a reception mode for receiving data (S316). The determination of the reception mode is performed in association with the input mode selected by the transmitter. For example, as shown in FIG. 9B, the reception mode may be easily determined by a data transmission mode identifier 321 included in the received data.

For example, if the received image data is in the normal DMS, the controller 6 controls the method of FIG. 14A to be performed from step S286 (L). If the received image data is in the image DMS mode, the controller 6 determines an image reception mode (S318). The image reception mode is divided into the mode without division of the transmitter and receiver regions (FIG. 2C) and the mode with division of the transmitter and receiver regions (FIG. 2D), as described above. The determination of the image reception mode is performed in association with the image transmission mode selected by the transmitter. For example, as shown in FIG. 9D, the image reception mode may be easily determined by an image transmission mode identifier 321 included in the received data.

If the received image reception mode is the mode without division of the transmitter and receiver regions (S320), the controller 6 determines whether or not the time information is included (S322). It is determined whether or not the time information is included, by way of the identifier 322 for identifying whether or not the time information is included, in the data format of FIG. 9B. If the time information is not included in the received data, the controller 6 displays the received image data (S328) on the display 9 without change (S344). If the time information is included in the received data, the controller 6 analyzes the time information associated with the received image data (S324) (S326) and displays the image data on the display 8 based on the time information (S344).

If the received image reception mode is the mode with division of the transmitter and receiver regions (S330), the controller 6 determines whether or not the time information is included (S332). It is determined whether or not the time information is included, by way of the identifier 322 for identifying whether or not the time information is included, in the data format of FIG. 9B. If the time information is not included in the received data, the controller 6 analyzes only the display coordinate of received image data (S340) (S342). That is, if the transmitter wants to display the image in a specific region, for example, the transmitter image region or the receiver image region, the relative coordinate is analyzed in order to display the image in the region desired by the transmitter. The image is displayed on the display 8 in the specific region according to the analyzed coordinate result (S344). If the time information is included in the received data, the controller 6 analyzes the time information of the received image data as well as the display coordinate (S336) of the received image data (S334) (S338). Thereafter, the controller 6 controls the image to be displayed on the screen of the display 8 in the region desired by the transmitter at a desired time based on the analyzed coordinate and time information (S344).

In an embodiment of the present invention, modes without division of transmitter and receiver regions may appear like modes with division of transmitter and receiver regions if the image or a sketch is drawn only within the transmitter or receiver regions. Additionally, in various embodiments, drawings may include sketches, which refer to drawings drawn by a transmitter, an image input by the transmitter, and others, and may include a doodle, a letter, a symbol, a character, a number, an icon, graphics, clip art, a line, a shape, a color, a still image, a moving image, a tracing or other markings.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for transmitting data in a mobile terminal, the method comprising:
   generating image data from a sketch being drawn on a screen of the mobile terminal;
   determining a call mode of the mobile terminal;
   enabling an image transmission mode to be selected when the call mode is a video call mode; and
   compressing the image data of the sketch and transmitting the compressed image data
   wherein the transmitting of the compressed image data occurs according to the image transmission mode that includes at least one of an image transmission mode without division of the compressed image data over transmitter and receiver regions of the screen and an image transmission mode with division of the compressed image data over the transmitter and receiver regions of the screen.

2. The method according to claim 1, further comprising:
determining a call mode of the mobile terminal as a voice call mode, wherein the transmitting of the compressed image data occurs when the call mode of the mobile terminal is the voice call mode.

3. The method according to claim 1, wherein time information associated with the sketch being drawn is generated, and transmitted when the compressed image data is transmitted.

4. The method according to claim 3, wherein the time information is generated whenever a portion of the sketch is drawn, and an overall compressed image data of the sketch is transmitted with the time information of the corresponding portion of the sketch after the overall image data is generated.

5. The method according to claim 3, wherein the time information is generated whenever a portion of the sketch is drawn, and a portion of the compressed image data corresponding to the portion of the sketch is transmitted with the corresponding time information whenever the portion of the compressed image data is generated.

6. The method according to claim 3, wherein coordinate information associated with the time information is further generated, and transmitted when the compressed image data is transmitted.

7. The method according to claim 1, wherein an identifier for identifying an image transmission mode is also transmitted.

8. The method according to claim 1, wherein coordinate information associated with the sketch being drawn is generated, and transmitted when the compressed image data is transmitted.

9. An apparatus for transmitting data in a mobile terminal, the apparatus comprising:
a communication unit which performs communication with an external device;
a user input unit which allows data and/or an image in a form of a sketch being drawn to be input; and
a controller which generates image data from the sketch being drawn from the user input unit, controls the image data of the sketch to be compressed, and controls the compressed image data to be transmitted
wherein the controller further determines a call mode of the mobile terminal, enables an image transmission mode to be selected when the call mode is a video call mode, and controls the compressed image data to be transmitted according to the image transmission mode that includes at least one of an image transmission mode without division of the compressed image data over transmitter and receiver regions on a screen of the mobile terminal and an image transmission mode with division of the compressed image data over the transmitter and receiver regions on a screen of the mobile terminal.

10. An apparatus according to claim 9, wherein the controller further determines a call mode of the mobile terminal as a voice call mode, and controls the compressed image data to be transmitted when the call mode is the voice call mode.

11. A method for receiving data in a mobile terminal, the method comprising:
determining whether data received in a transmission format is text or an image; and
decompressing the received image data when the received data is an image, and displaying the decompressed image data in an image display mode of the mobile terminal, wherein the decompressed image data is a sketch drawn on a screen of another mobile terminal, and
wherein if a call mode of the mobile terminal is determined as a video call mode, display the decompressed image data according to an image transmission mode of the received image data that includes at least one of an image transmission mode without division of the decompressed image data over transmitter and receiver regions of a screen of the mobile terminal and an image transmission mode with division of the decompressed image data over the transmitter and receiver regions of the screen of the mobile terminal.

12. The method according to claim 11, further comprising determining whether time information associated with the sketch being drawn is included, when the image data is received, and the time information is used for displaying the decompressed image data of the drawn sketch.

13. An apparatus for receiving data in a mobile terminal, the apparatus comprising:
a communication unit which performs communication with an external device;
a display unit which displays received data; and
a controller which determines whether data received in a transmission format is text or an image, controls the received image data to be decompressed when the received data is an image, and controls the decompressed image data to be displayed in an image display mode of the mobile terminal, wherein the decompressed image data is a sketch drawn on a screen of another mobile terminal,
wherein if the controller determines a call mode of the mobile terminal as a video call mode, the controller controls the decompressed image data to be displayed according to an image transmission mode of the received image data that includes at least one of an image transmission mode without division of the decompressed image data over transmitter and receiver regions of a screen of the mobile terminal and an image transmission mode with division of the decompressed image data over the transmitter and receiver regions of the screen of the mobile terminal.

* * * * *